(12) United States Patent
Xu

(10) Patent No.: US 9,487,070 B2
(45) Date of Patent: Nov. 8, 2016

(54) TRUCK FOLDING BACK COVER

(71) Applicant: Cixi City Liyuan Auto Parts Co., Ltd, Cixi (CN)

(72) Inventor: Enli Xu, Cixi (CN)

(73) Assignee: CIXI CITY LIYUAN AUTO PARTS CO., LTD, Cixi (CN)

( * ) Notice: Subject to any disclaimer, the term of this patent is extended or adjusted under 35 U.S.C. 154(b) by 0 days.

(21) Appl. No.: 14/810,458

(22) Filed: Jul. 27, 2015

(65) Prior Publication Data

US 2016/0114666 A1 Apr. 28, 2016

(30) Foreign Application Priority Data

Oct. 22, 2014 (CN) .................... 2014 2 0609144 U
Oct. 22, 2014 (CN) .................... 2014 2 0609156 U
Oct. 22, 2014 (CN) .................... 2014 2 0609157 U

(51) Int. Cl.
*B60J 7/14* (2006.01)
*B60P 7/02* (2006.01)
*B60J 7/10* (2006.01)

(52) U.S. Cl.
CPC ........ *B60J 7/141* (2013.01); *B60J 7/10* (2013.01); *B60P 7/02* (2013.01)

(58) Field of Classification Search
CPC .............. B60J 7/10; B60J 7/14; B60J 7/141; B60P 7/02
USPC ............ 296/100.01, 100.02, 100.06, 100.07, 296/100.09, 136.03; 403/122
See application file for complete search history.

(56) References Cited

U.S. PATENT DOCUMENTS

| | | | | |
|---|---|---|---|---|
| 4,431,330 A | * | 2/1984 | Darnell | F16C 11/069 29/441.1 |
| 4,520,546 A | * | 6/1985 | Darnell | F16C 11/069 29/441.1 |
| 5,228,737 A | * | 7/1993 | Zimmerman | B62D 25/12 217/61 |
| 7,021,693 B2 | * | 4/2006 | Keller | B60J 7/141 296/100.06 |
| 7,993,070 B2 | * | 8/2011 | Kull | F16C 1/14 296/146.8 |
| 8,480,154 B2 | * | 7/2013 | Yue | B60J 7/141 296/100.07 |
| 8,960,765 B2 | * | 2/2015 | Facchinello | B60J 7/141 296/100.06 |
| 2007/0210609 A1 | * | 9/2007 | Maimin | B60P 7/02 296/100.09 |
| 2012/0274091 A1 | * | 11/2012 | Yue | B60J 7/141 296/100.04 |

* cited by examiner

*Primary Examiner* — Jason S Daniels
(74) *Attorney, Agent, or Firm* — Kilpatrick Townsend & Stockton LLP

(57) ABSTRACT

System for covering a truck bed includes side rails attachable to bed rails of the truck. The side rails include mounting positions. The system includes clamps to secure the side rails to the bed rails and a cover positioned above the side rails. The cover includes a first panel and a second panel positioned rearward of the first panel. The cover includes cover rails coupled near ends of the first panel and near ends of the second panel. The cover includes hinges positioned between the cover rails of the first panel and the second panel to pivotably couple the first panel with the second panel. The cover includes mounting features coupled with the cover rails of the first panel and mounting features coupled with the mounting positions. Rods are coupled with the cover rail mounting features and the mounting position mounting features to maintain the cover in a folded position.

16 Claims, 18 Drawing Sheets

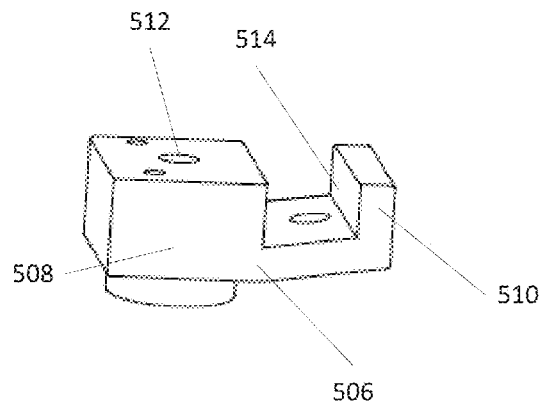
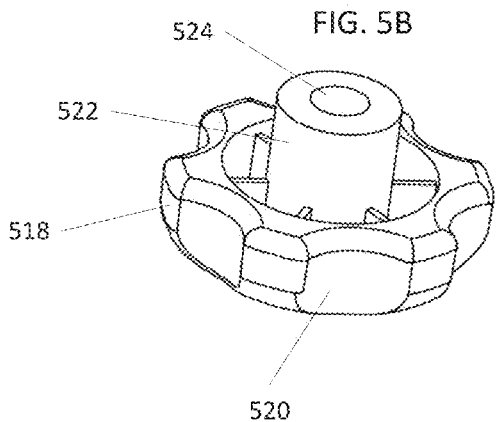
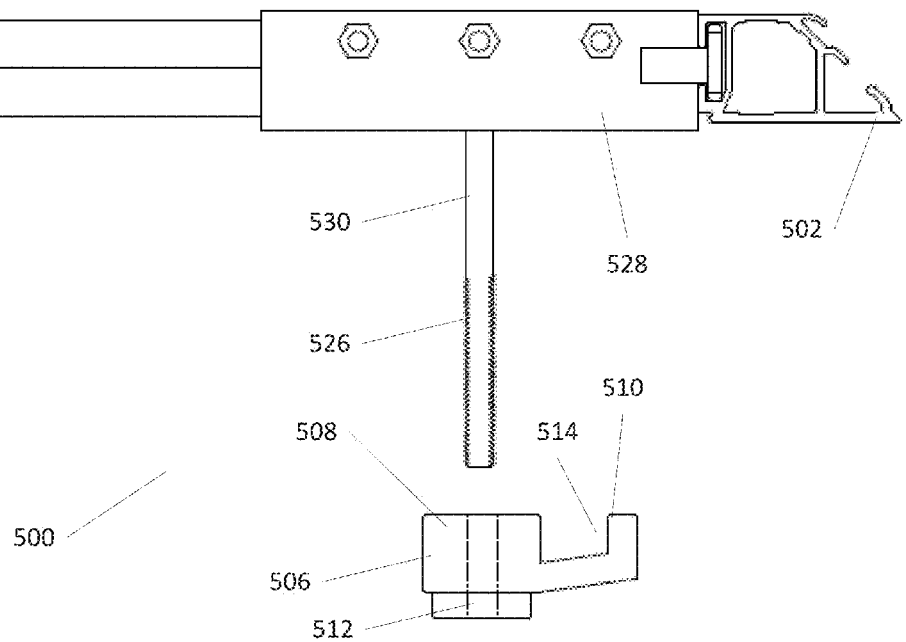
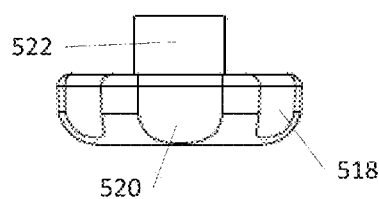

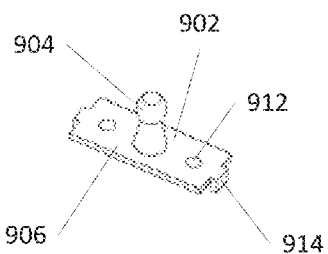
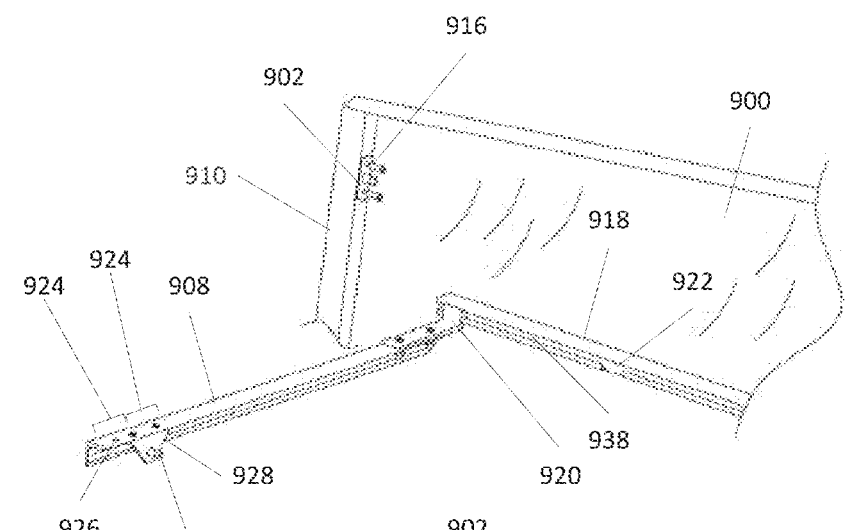
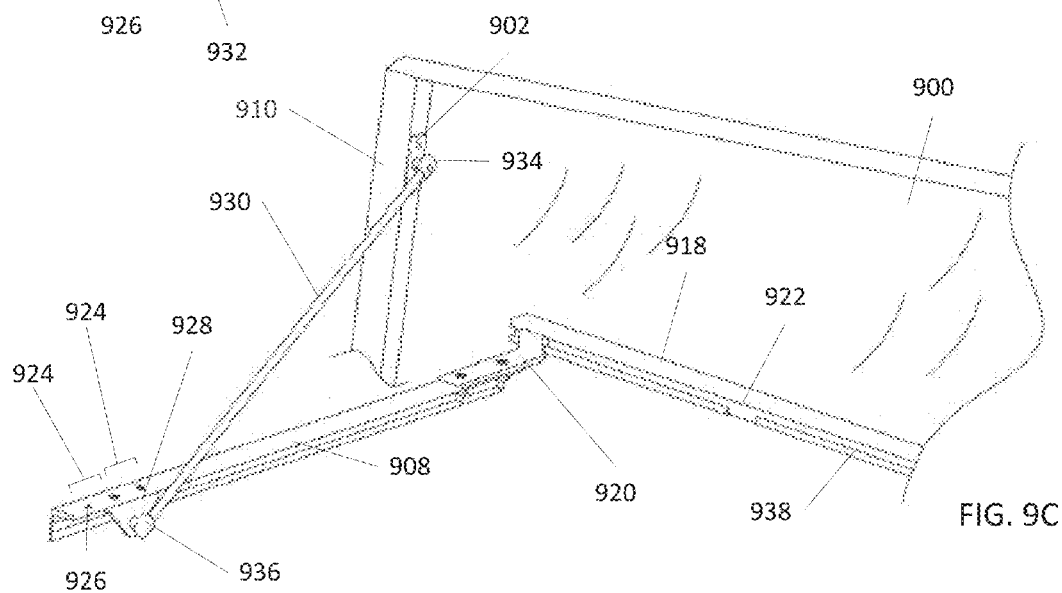
FIG. 9A
FIG. 9B
FIG. 9C

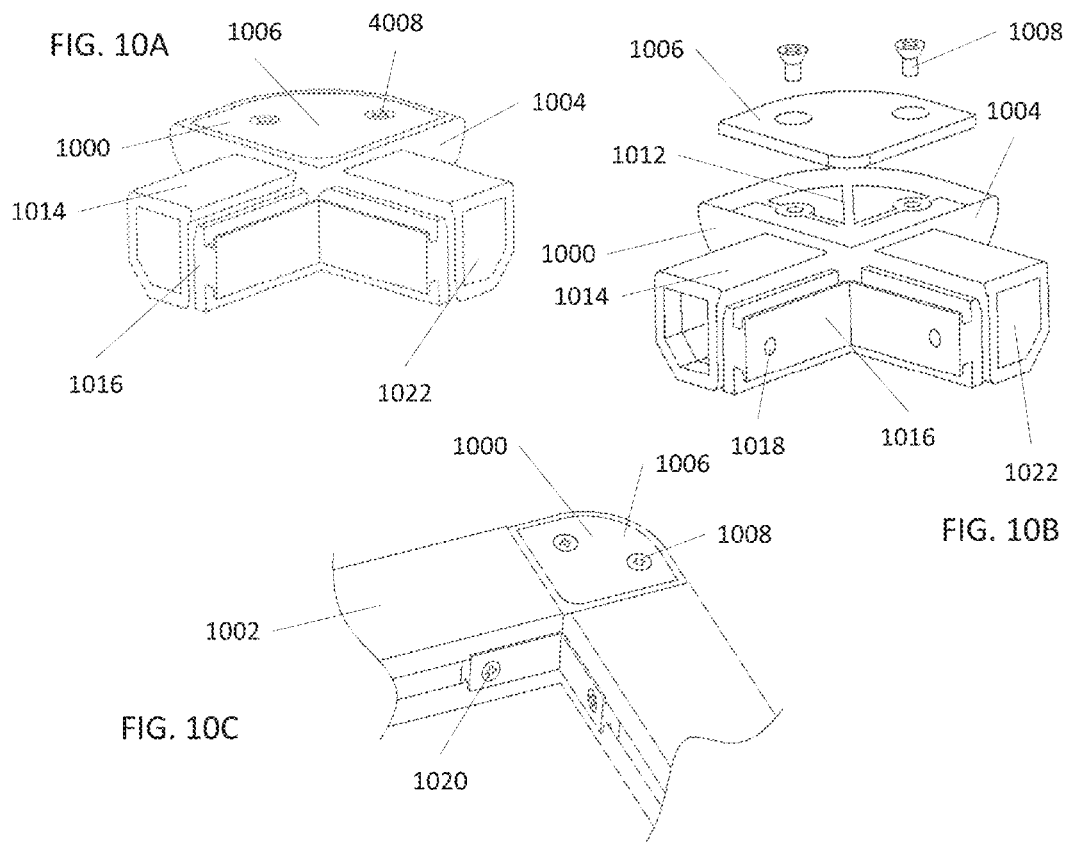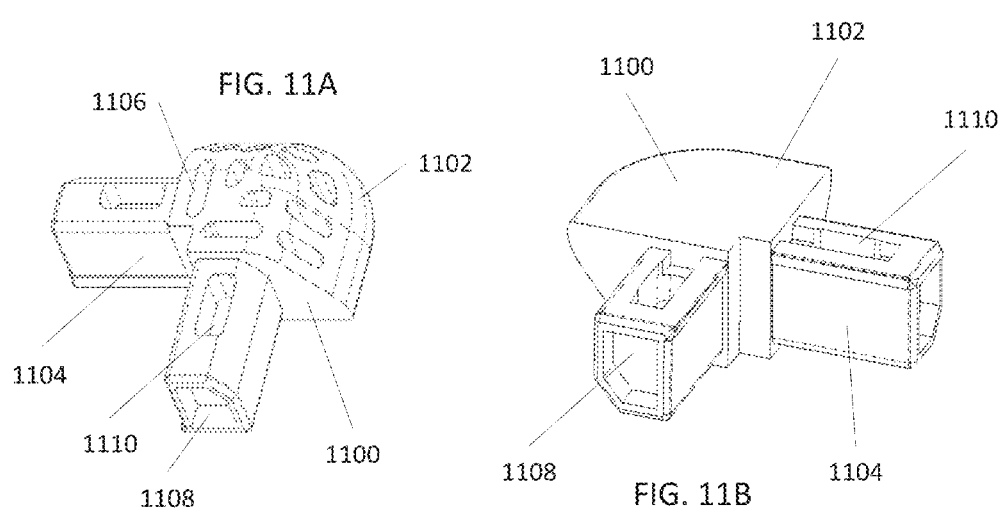

TRUCK FOLDING BACK COVER

This application claims priority to Chinese Patent Application No. 201420609144.2, 201420609156.5 and 201420609157.X, filed Oct. 22, 2014, which are incorporated by reference herein for all purposes.

BACKGROUND OF THE INVENTION

Cover systems are often used to protect cargo beds of pickup trucks. The cover systems often cover all or a portion of the cargo bed such that any items stored and/or hauled in the cargo bed are protected from outside elements, as well as theft. In order to accommodate the storage and/or hauling of larger objects, as well as to facilitate easy loading and unloading of the cargo bed, many conventional cover systems are foldable into a storage position. This enables the cargo bed to be exposed without removing the cover entirely from the truck. However, this can cause visibility problems, as conventional cover systems block the view through the rear window of the pickup truck when the cover is in a folded position. Thus, driving may be unsafe while the cover system is folded for any reason.

BRIEF SUMMARY OF THE INVENTION

The present invention provides folding tonneau cover systems that seal and protect the cargo bed of a pickup truck. The cover systems may extend to cover all or part of the cargo bed, or may be folded up and locked into a stowed position. The stowed position may be adjusted such that at least a portion of a rear window of the pickup truck may be exposed. This makes driving with a cover system much safer. Embodiments may utilize panel sizes and/or adjustable stowed positions to provide the added visibility In one aspect, a flexible tonneau cover system for covering a bed of a pickup truck is provided. The system may include a plurality of side rails configured to be mounted on a bed rail of the pickup truck. Each of the plurality of side rails may include a channel running along a length of the side rail and an opening positioned in between a first end and a second end of the side rail to provide access to the channel. The system may also include a flexible tonneau cover configured to be releasably secured to the plurality of side rails to cover the bed of the pickup truck and a plurality of clamps configured to secure the plurality of side rails to a bed rail of the pickup truck. Each of the plurality of clamps may be adjustable such that the plurality of clamps may be sizeable to fit on the pickup bed rail. Each of the plurality of clamps may include a mounting portion configured to be insertable into the opening and slidable within the channel to secure the clamp with one of the plurality of side rails.

In another aspect, a flexible tonneau cover system may include a plurality of side rails that are mountable on a bed rail of the pickup truck and a flexible tonneau cover configured to be securable to the plurality of side rails to cover the bed of the pickup truck. The system may also include a plurality of clamps configured to secure the plurality of side rails to a bed rail of the pickup truck. Each of the plurality of clamps may include a pivotable arm such that in a storage position the pivotable arm may be positioned substantially parallel to the flexible tonneau cover. In a secured position the pivotable arm may be positioned orthogonal to the flexible tonneau cover such that a hook portion coupled with the pivotable arm may be engageable with the pickup bed rail.

In one aspect, a tonneau cover system for covering a bed of a pickup truck is provided. The system may include a first side rail attachable to a first bed rail of the pickup truck and a second side rail attachable to a second bed rail of the pickup truck. The first side rail may include a first plurality of mounting positions and the second side rail may include a second plurality of mounting positions. The system may also include a plurality of clamps configured to secure the first side rail to the first bed rail and the second side rail to the second bed rail and a cover positioned above the first side rail and the second side rail. The cover may include a first panel and a second panel positioned rearward of the first panel. The cover may also include a first cover rail coupled near a first end of a bottom surface of the first panel, a second cover rail coupled near a second end of the bottom surface of the first panel, a third cover rail coupled near a first end of a bottom surface of the second panel, and a fourth cover rail coupled near a second end of the bottom surface of the second panel. The cover may further include a first hinge and a second hinge. The first hinge may be positioned between and coupled with the first cover rail and the third cover rail. The second hinge may be positioned between and coupled with the second cover rail and the fourth cover rail such that the first panel is pivotably coupled with the second panel. The cover may also include a first mounting feature removably coupled with the first cover rail and a second mounting feature removably coupled with second cover rail. The system may also include a third mounting feature removably coupled with one of the first plurality of mounting positions and a fourth mounting feature removably coupled with one of the second plurality of mounting positions. The system may also include a first rod removably coupled with the first mounting feature and the third mounting feature and a second rod removably coupled with the second mounting feature and the fourth mounting feature. The first rod and the second rod may be configured to maintain the cover in a folded position.

In another aspect, a tonneau cover system may include a first side rail attachable to a first bed rail of the pickup truck. The first side rail having a plurality of mounting positions. The system may also include a second side rail attachable to a second bed rail of the pickup truck and a head rail coupled between the first side rail and the second side rail. The system may include a cover positioned above the first side rail, the second side rail, and the head rail. The cover may include a first panel and a second panel pivotably coupled with the first panel. The second panel may be positioned rearward of the first panel. The cover may further include a first mounting feature removably coupled with the first panel. The system may include a second mounting feature removably coupled with one of the plurality of mounting positions. A rod may be removably coupled with the first mounting feature and the second mounting feature such that the rod maintains the cover in a folded position.

In another aspect, a tonneau cover system may include a first side rail attachable to a first bed rail of the pickup truck and a second side rail attachable to a second bed rail of the pickup truck. The first side rail may include a plurality of mounting positions. The system may also include a cover positioned above the first side rail and the second side rail. The cover may include a plurality of panels. Each of the plurality of panels may be pivotably coupled with at least one other of the plurality of panels. A forwardmost panel of the plurality of panels may include a first mounting feature. The system may also include a second mounting feature removably coupled with one of the first plurality of mounting positions and a rod removably coupled with the first mounting portion and the second mounting portion such that the rod maintains the cover in a folded position.

BRIEF DESCRIPTION OF THE DRAWINGS

FIG. 5A depicts a hook portion of a clamp according to embodiments.

FIG. 5B, depicts a knob of a clamp according to embodiments.

FIG. 5C depicts an exploded view of a clamp according to embodiments.

FIG. 9A shows a mounting feature according to embodiments.

FIG. 9B shows a side rail and a cover rail according to embodiments.

FIG. 9C shows a rod securing a cover in a stowed position according to embodiments.

FIG. 10A shows an isometric view of a corner piece according to embodiments.

FIG. 10B shows an exploded view of the corner piece of FIG. 10A according to embodiments.

FIG. 10C shows the corner piece of FIG. 10A coupling side rails together according to embodiments.

FIG. 11A shows an isometric top view of a corner piece according to embodiments.

FIG. 11B shows an isometric bottom view of the corner piece of FIG. 11A according to embodiments.

DETAILED DESCRIPTION OF THE INVENTION

The present invention provides folding tonneau cover systems that seal and protect the cargo bed of a pickup truck. The cover systems may extend to cover all or part of the cargo bed, or may be folded up and locked into a stowed position. The stowed position may be adjusted such that at least a portion of a rear window of the pickup truck may be exposed. This makes driving with a cover system much safer. Embodiments may utilize panel sizes and/or adjustable stowed positions to provide the added visibility.

Figure 1A:
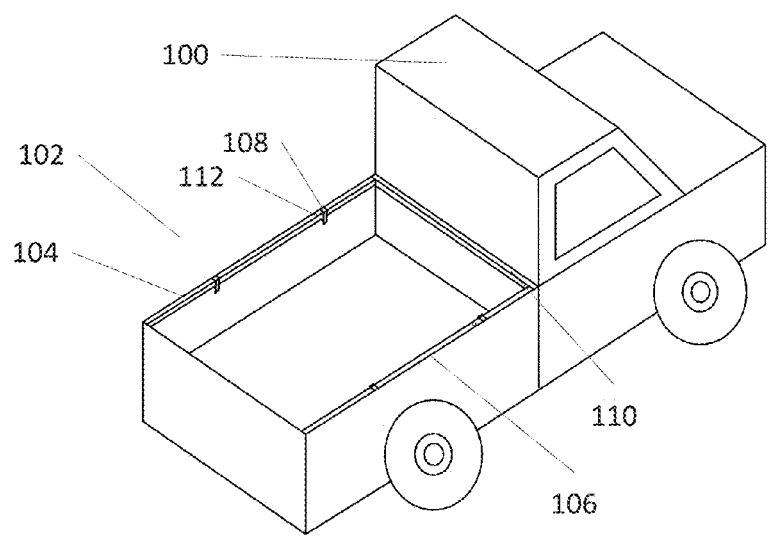
FIG. 1A shows a pickup truck with side rails secured to bed rails of the truck according to embodiments.

Referring now to FIGS. 1A-1H, one embodiment of a pickup truck 100 having a foldable tonneau cover system 102 is shown. FIG. 1A shows pickup truck 100 with side rails 104 secured to bed rails 106 of the truck 100. Side rails 104 may extend along all or part of a length of the bed of truck 100. Side rails 104 may be secured to the bed rails 106 using one or more clamps 108. Clamps 108 may be C-clamps, clamps 300 or 400 described herein, or any other clamps known in the art. The number of clamps 108 used may depend on the size of truck 100, although oftentimes only one or two clamps 108 are necessary on each side of the truck 100 to safely secure the side rails 104 to the bed rails 106. In some embodiments, clamps 108 may be configured to interface with mating features on the side rails 104, while in other embodiments, the clamps 108 may be configured to fit at any position of the side rails 104. The clamps 108 may be spaced equal distances apart from one another or may be staggered at varying intervals. In some embodiments, the cover system 102 may include a head rail 110 positioned next to a cab of the truck 100 and forward of the side rails 104. The side rails 104 may include one or more mounting features 112. Mounting features 112 may be positioned along the length of the side rails 104. In some embodiments, multiple mounting positions may be provided on the side rails 104 such that the location of the mounting feature 112 may be adjusted.

Figure 1B:
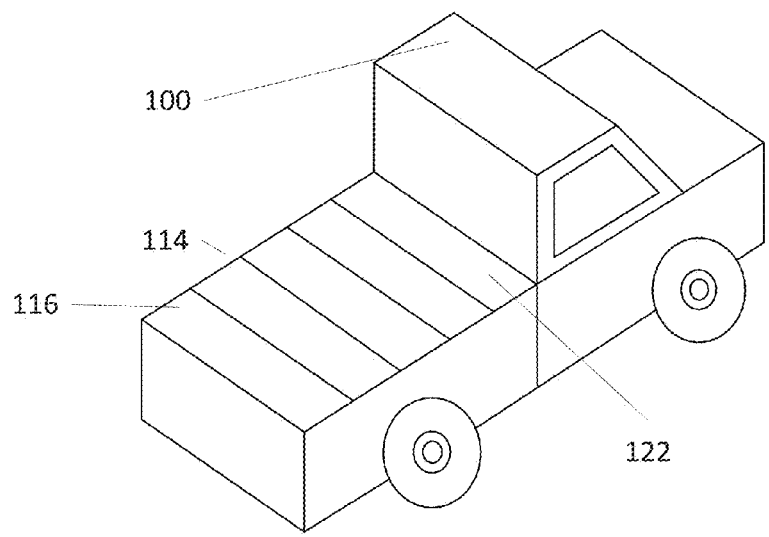
FIG. 1B shows the truck of FIG. 1A having a cover positioned over the entire length of the truck bed according to embodiments.
Figure 1C:
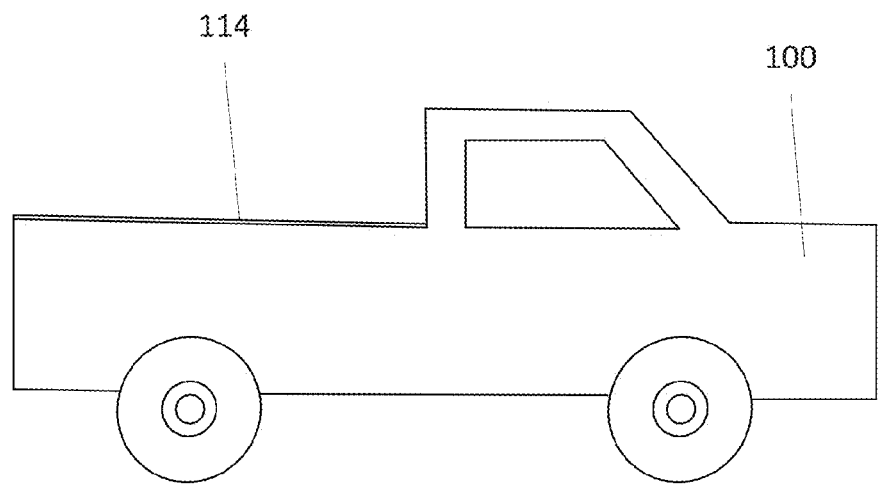
FIG. 1C is a side view of the truck of FIG. 1B according to embodiments.
Figure 1D:
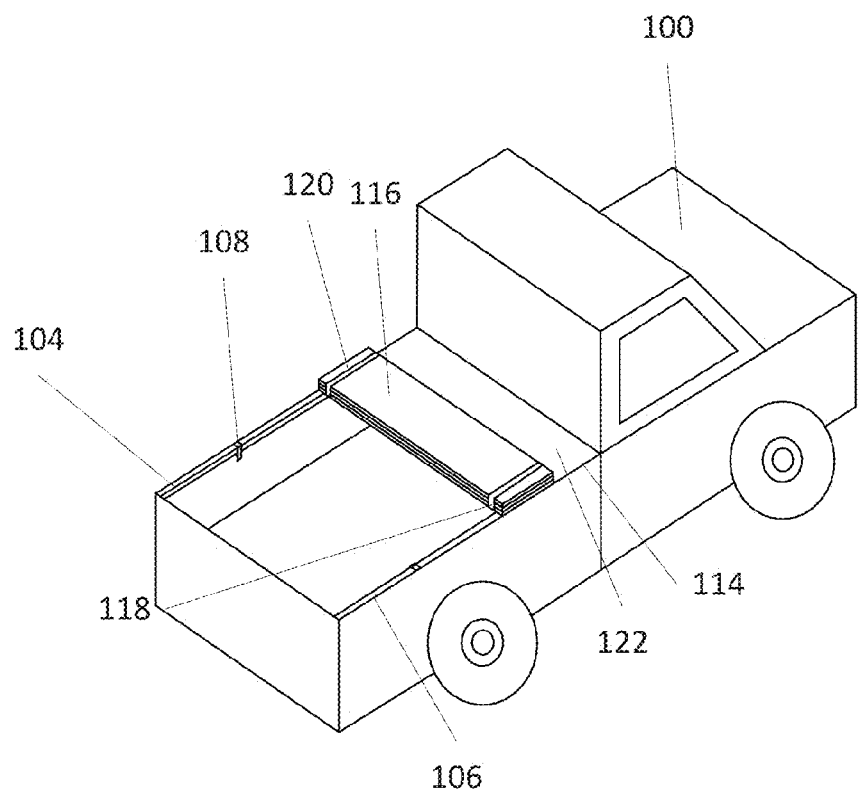
FIG. 1D shows the truck of FIG. 1A with the cover partially folded according to embodiments.
Figure 1E:
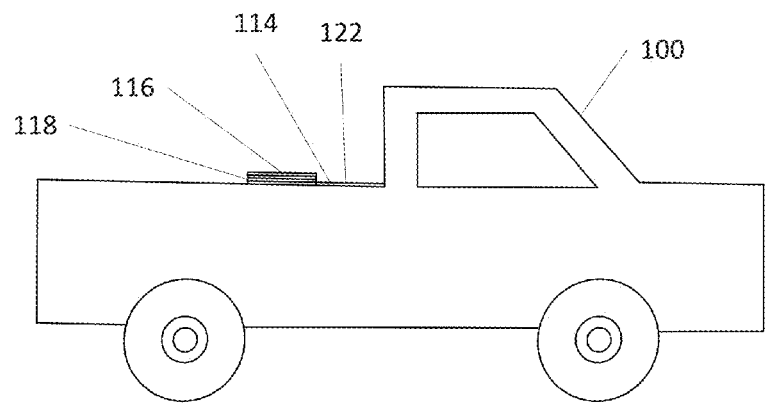
FIG. 1E shows a side view of the truck of FIG. 1D according to embodiments.

FIG. 1B shows truck 100 having a cover 114 positioned over the entire length of the truck bed. Cover 114 may include one or more panels 116 that are pivotably coupled with one another. While shown here with five panels 116, it will be appreciated that any number of panels 116 may be used to form cover 114, such as two, three, four, or six panels, although additional panels 116 may be used. The panels 116 may be formed from a single piece of material and/or share an external cover such that there are no exposed seams for external substances to leak through. In other embodiments, the panels 116 may be separate pieces of material coupled together. Strips of material may be provided to cover the seams formed from the junction of the panels 116 allow the cover 114 to seal the bed. Cover 114 may be made of a metal, a synthetic material such as a plastic, leather, and/or a combination of such materials. Cover 114 may be less than 1 inch thick, such that minimal height is added to the profile of the truck bed as seen in the side view of FIG. 1C, although thicker covers 114 may be used. The panels 116 may be folded back on one another toward a front of the bed to expose all or a portion of the bed as shown in FIG. 1D. In some embodiments, hinges 118 are used to pivotably couple the panels 116 together. In some embodiments, hinges 118 may be positioned on an underside of the panels 116. This allows the hinges to be protected from outside elements and also allows the cover to have a flat or relatively flat surface. In some embodiments, hinges 118 may be coupled with cover rails 120 that are positioned on an underside of some or all of the panels 116. Each panel 116 may have a cover rail 120 on a left and a right side of the panel 116, and the cover rails 120 of adjacent panels 116 may be coupled to one another using a hinge 118. Hinges 118 enable any number of panels 116 to be folded back on one another toward a front of the bed to expose a desired amount of the bed. FIG. 1E shows a side view of truck 100 with cover 114 in a partially folded position.

Figure 1F:
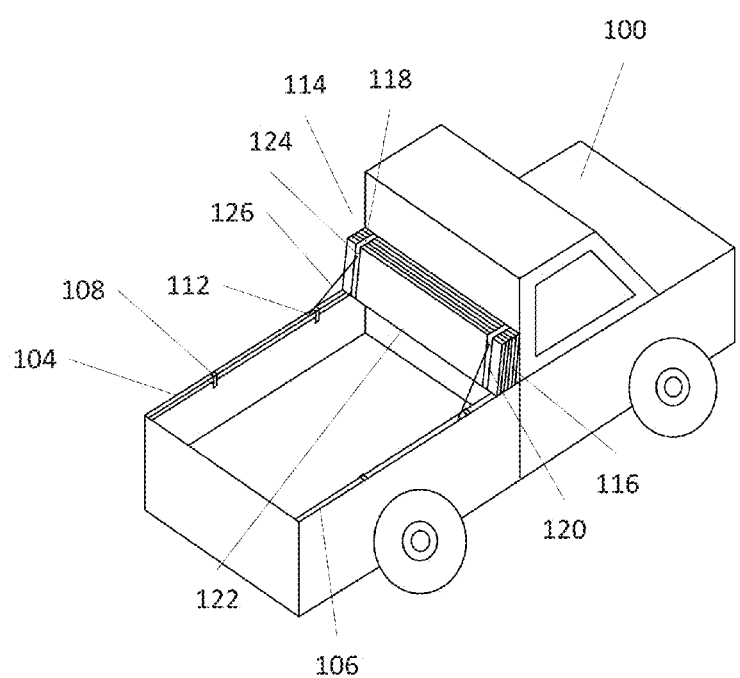
FIG. 1F shows the truck of FIG. 1A with the cover folded into a stowed position according to embodiments.
Figure 1G:
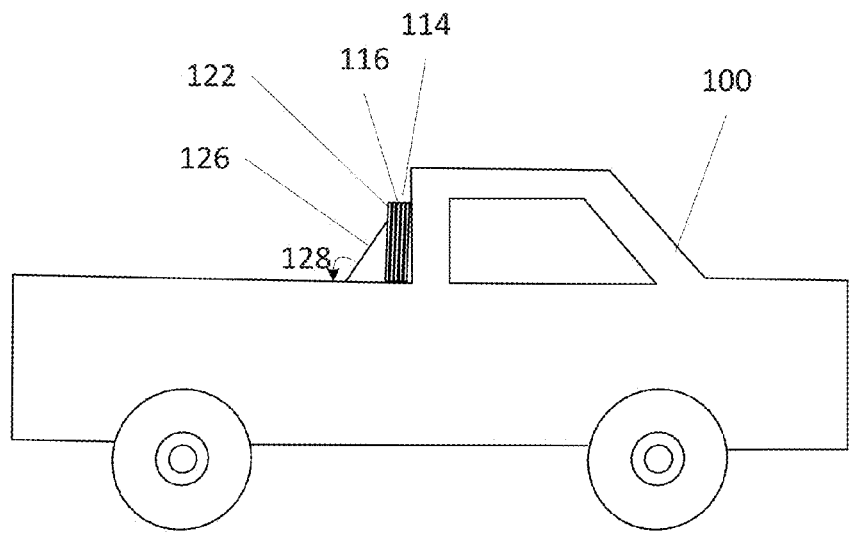
FIG. 1G shows a side view of the truck of FIG. 1F according to embodiments.
Figure 1H:
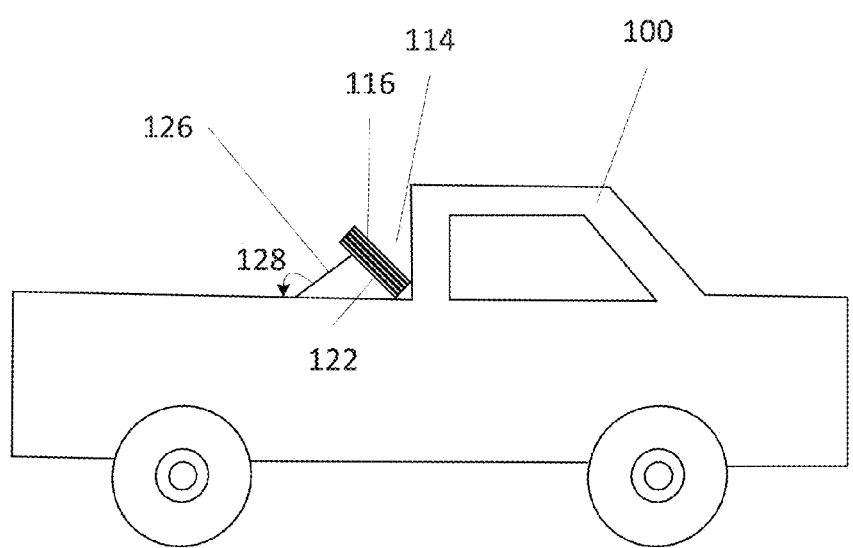
FIG. 1H shows the truck of FIG. 1G having rods at a second angle according to embodiments.

FIG. 1F shows the cover 114 folded into a stowed position. In the stowed position, a forwardmost panel 122 of panels 116 may include one or more mounting features 124 on an underside of the panel 122. In some embodiments, the mounting features 124 may be coupled with or formed integral to the cover rails 120, while in other embodiments, the mounting features 124 may be coupled with the underside of the panel 122. The mounting features 124 on the panel 122 and the mounting features 112 of the side rails may be configured to be removably coupled with rods 126 to maintain cover 114 in the stowed position. In some embodiments, mounting features 112 and/or mounting features 124 are configured to lockably receive an end of a rod 126. In other embodiments, rods 126 may be configured to lockably receive a portion of mounting features 112 and/or mounting features 124. When not used to lock cover 114 in a stowed position, rod 126 may be snapped into or magnetically secured to a rod storage mechanism (not shown). A length of panels 116 may be selected such that when in the stowed position, at least a portion of the rear window of the truck 100 is exposed. In some embodiments, multiple mounting positions are included on one or both of the side rails 104 and/or the forward-most panel 122 such that the location of the mounting features 112 and/or mounting features 124 may be adjusted as seen in FIGS. 1G and 1H. For example, in FIG. 1G, mounting features 112 and mounting features 124 are positioned with rod 126 at an angle 128 relative to the bed such that the cover 114 is folded at least substantially upright against a back of the cab of truck 100. In FIG. 1H, the angle 128 is increased to change the angle of the folded cover 114. By angling the folded cover, the amount of rear window exposure may be increased to enhance driver visibility. The lengths of panels 116 and/or the possible rod angles 128 may be selected to meet the visibility needs and dimensions of a particular truck or may be standardized for lower manufacturing costs.

As shown in FIG. 1G, that the rod 126 in one of the positions pushes the folded cover against the back windows of the truck, and the folded cover 114 is in a substantially standing position as shown in FIG. 1G, where the folded cover is substantially standing. At the "standing position" in FIG. 1G, the folded cover 114 is substantially stable compared to other positions. For example, the folded cover 114 has a substantially flat surface at the bottom shared by the panel edges, and the flat surface helps the folded cover 114 stay in the standing position. Being sandwich between the truck window and the rod 126, the folded cover 114 is secure and physically more stable than other positions, such as the angle position shown in FIG. 1H. Additionally, the folded cover 114 occupies the least horizontal space over the truck bed at the standing position shown in FIG. 1G compared to other positions. For example, it is relatively easier to load things into the truck when the folded cover 114 is at the standing position.

Figure 2A:
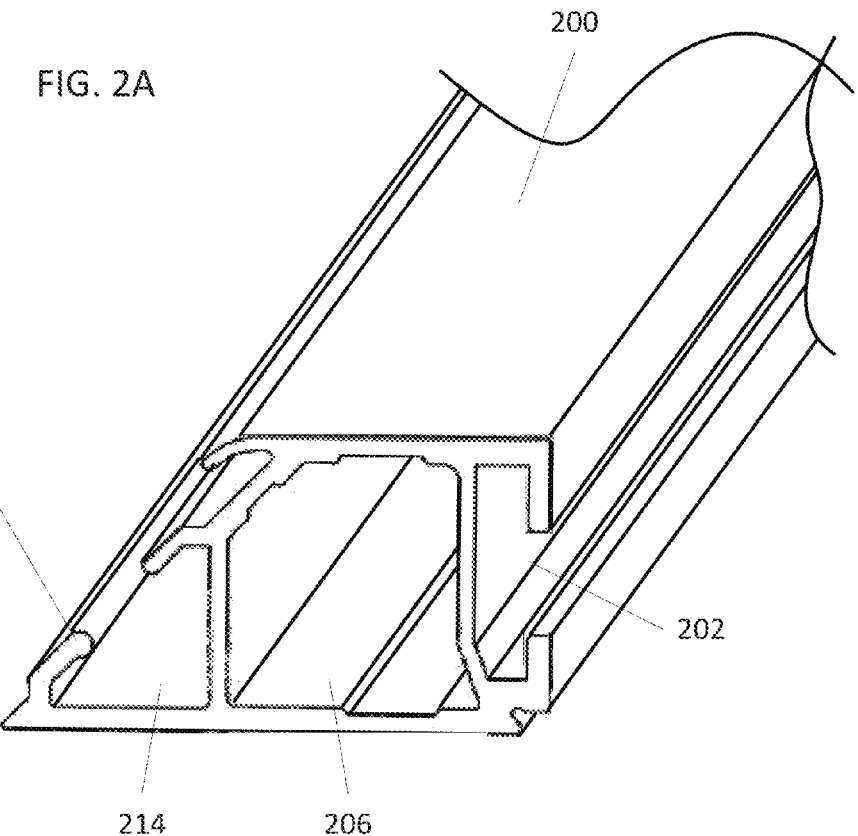
FIG. 2A is an isometric view of a side rail according to embodiments.
Figure 2B:
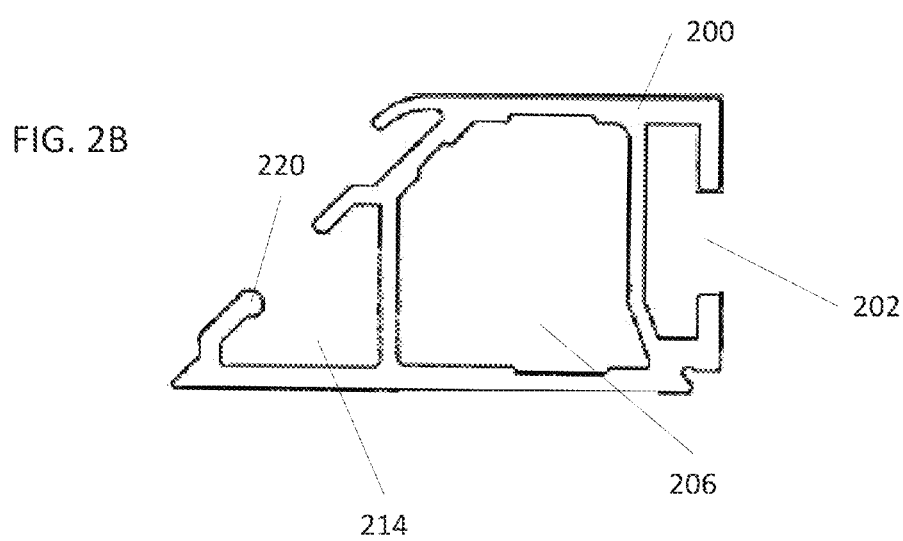
FIG. 2B is a side view of the side rail of FIG. 2A according to embodiments.

FIGS. 2A-2D show an embodiment of a side rail 200 that is securable to a bed rail of a truck. Side rail 200 may include a channel or slot 202 that may receive a mounting portion of a clamp, such as mounting portions 302 and 406 of clamps 300 and 400 described in FIGS. 3A-4D. In some embodiments, side rail 200 defines a central opening 206 as seen in FIG. 2B. Central opening 206 may extend entirely through side rail 200 or may extend partially through side rail 200. In some embodiments, side rail 200 may define central openings 206 on both ends of side rail 200. Central opening 206 may receive a mating feature of another component of a cover system, such as a leg of a corner piece as described in FIGS. 10A-11B.

Figure 2C:
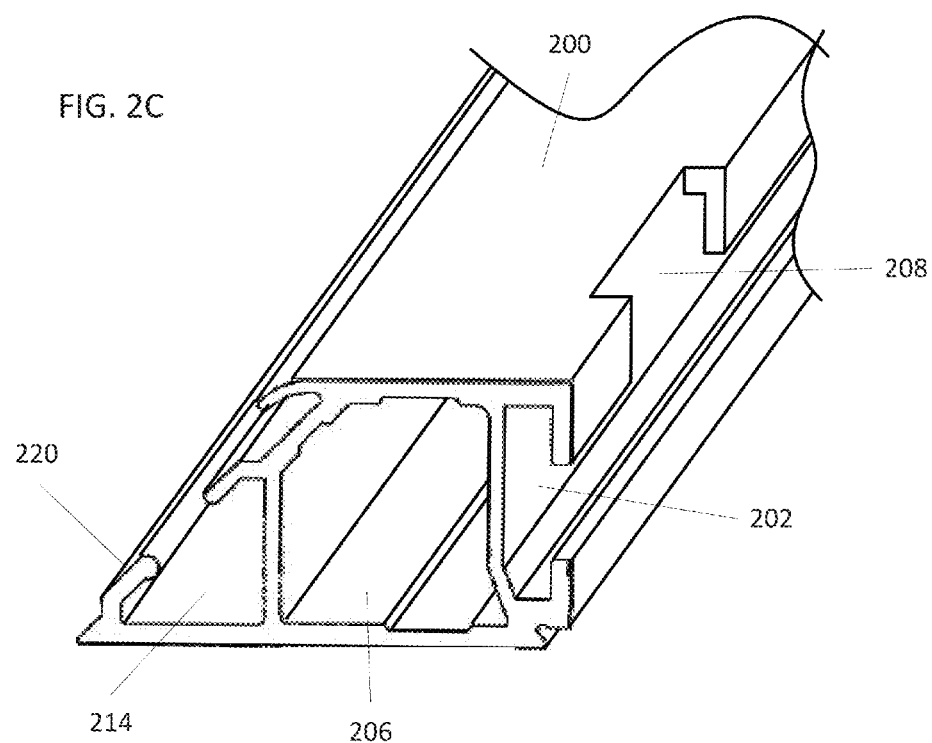
FIG. 2C is an isometric view of the side rail of FIG. 2A having an opening according to embodiments.
Figure 2D:
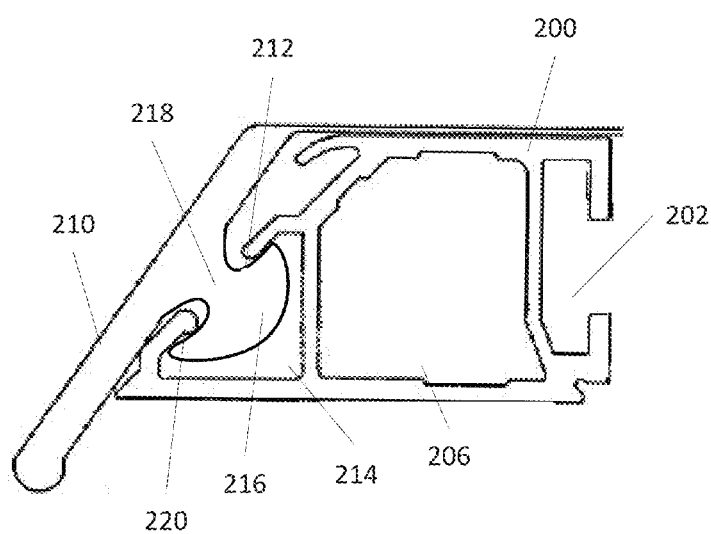
FIG. 2D is a side view of the side rail of FIG. 2A secured to a cover according to embodiments.

In some embodiments, side rail 200 may include an opening 208 positioned along the slot 202 as seen in FIG. 2C. Opening 208 may provide access to the slot 202 such that mounting features of components such as the clamps described in FIGS. 3A-4D may be inserted into opening 208 and slid within slot 202. Opening 208 may have a length that is longer than a length of the mounting feature. In some embodiments, the length of the opening 208 may be only slightly larger than the length of the mating feature to reduce the likelihood that the mating feature will slide out of slot 202 through the opening 208. For example, opening 208 may be longer than mounting feature by as little as 1/32 inches or as much as several inches.

Side rail 200 may be removably secured to a flexible cover 210. In some embodiments, side rail 200 may be secured to cover by using an attachment member 212 configured to snap into and be retained by a channel 214 of side rail 200. For example, attachment member 212 may include a head 216 and neck 218 protruding outward such that the head 216 may be received in channel 214, where retaining member 220 engage with a surface of head 216 near neck 218 to prevent attachment member 212 from separating from side rail 200. In some embodiments, attachment member 212 may be formed integral with or secured directly to cover 210, such as by using an adhesive, sonic welding, magnets, stitching, other fasteners, and/or combinations thereof. In other embodiments, attachment member 212 may be secured to a fastener, such as a fastening slat.

Other fastening structures may be used, and may utilize hook and loop fasteners, magnets, reusable adhesives, buttons, snaps, other fasteners, and/or combinations thereof.

It will be appreciated that other side rail designs may be utilized, such as an L-shaped rail. Side rails may be any length. For example, some side rails may extend along a full length of the truck bed, while other cover systems may use multiple side rails to run along the entire length. Side rails may be secured using clamps, bolts, and/or other fastening elements. In some embodiments, the side rails may include one or more built-in fastener and/or clamps. Oftentimes, the side rails may be removable and/or adjustable in a quick manner and include a fastening portion that is positioned above and/or outside of the bed rails of the truck such that when the cover is extended, the cover seals the entire truck bed. In some embodiments, clamps may be included on a top and/or side of the side rails to grasp an edge of the cover to secure the cover to the side rails. The clamps may extend along all or a portion of the side rails. For example, a clamp formed from a hinged rail extending along the length of the side rail may be used to secure the entire edge of the side of the cover. Such embodiments may eliminate the need for fastening elements on the side rails and/or cover.

Figure 3A:
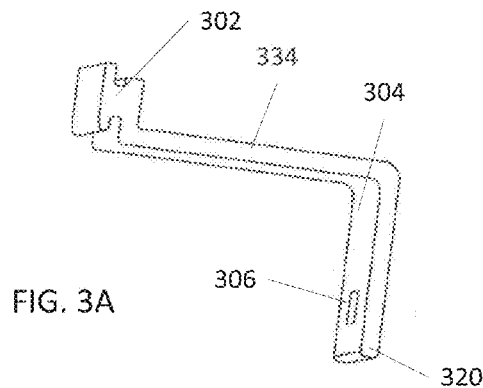
FIG. 3A shows an upper portion of a hook assembly of a clamp according to embodiments.
Figure 3B:
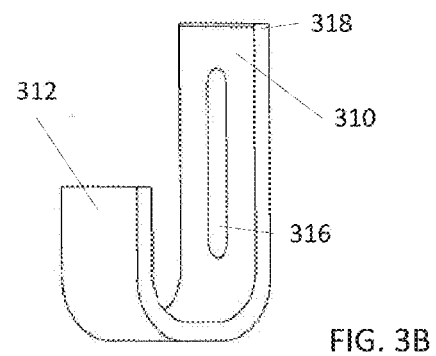
FIG. 3B shows a hook assembly of a clamp according to embodiments.
Figure 3C:
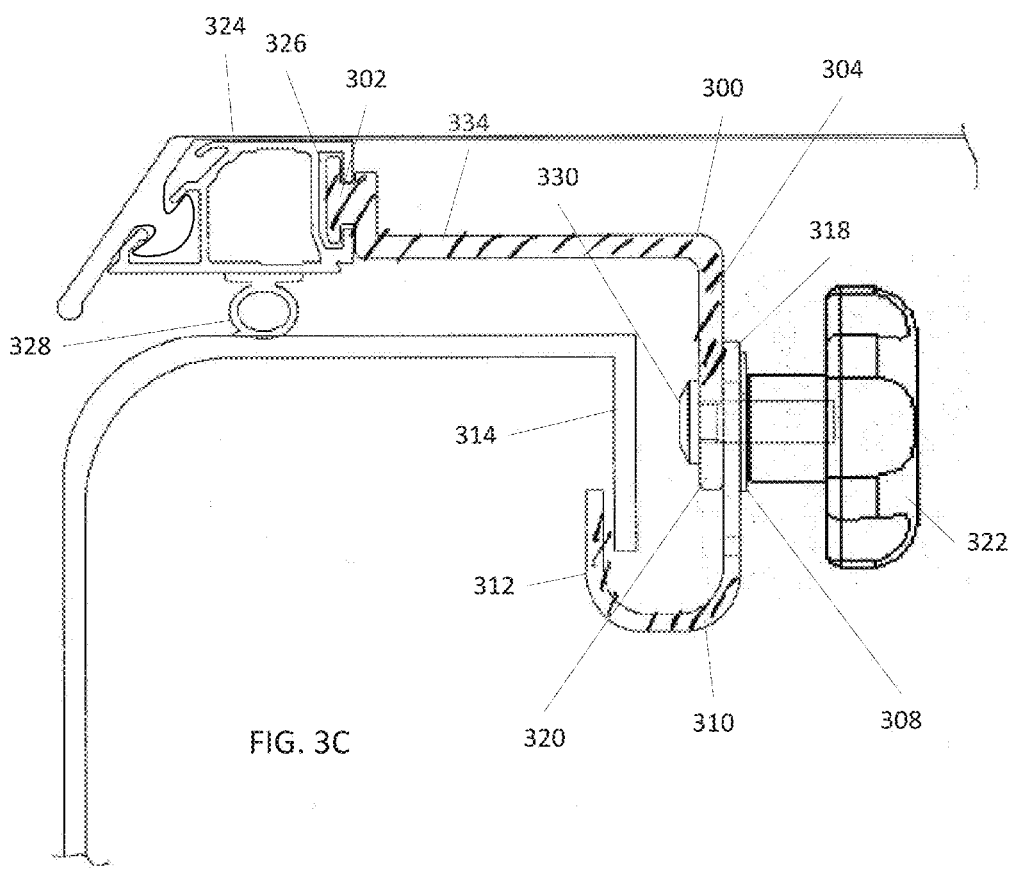
FIG. 3C shows a clamp securing a side rail to a bed rail according to embodiments.

FIGS. 3A-3C show one embodiment of a clamp 300 configured to secure a side rail 324 to a bed rail 314 of a truck. Clamp 300 may include a mounting portion 302 extending from an upper portion 304 of a hook assembly 308 as seen in FIG. 3A. The upper portion 304 may define an aperture 306. Aperture 306 may be spaced apart from mounting portion 302. FIG. 3B shows a hook assembly 308 may also include a lower portion 310 having a hook feature 312. The lower portion 310 may define an aperture 316 that may be aligned with aperture 306 of upper portion 304 such that the lower portion 310 interfaces with an inner surface of a bed rail 314 as seen in FIG. 3C. The aligned apertures may receive a fastener 330 that is tightenable to secure the clamp 300 onto the bed rail 314. For example, the fastener 330 may be tightenable using a knob or handle 322. Fastener may be a screw, bolt and nut, clamp, and/or other fastening device. In some embodiments, one or both of the apertures 306 and/or aperture 316 may be elongated such that a length of the hook assembly 308 may be adjusted by moving a top end 318 of the lower portion 310 relative to a bottom end 320 of the upper portion 304 to adjust a length of the hook assembly 308 to fit the bed rail 314. In some embodiments, an arm 334 extends between mounting portion 302 and aperture 306 such that side rail 324 coupled with the mounting portion 302 is positioned at or near an outer edge of bed rail 314 while aperture 306 is position above and/or within a bed of the truck. In some embodiments, a pad 328 may be positioned between bed rail 314 and side rail 324 to prevent the side rail 324 from damaging the bed rail 314.

The mounting portion 302 configured to be insertable into an opening of a side rail 324, similar to the opening 922 of FIGS. 9A-9C. The mounting portion 302 may then be slid into a desired position of a channel or slot 326 in the side rail 324 and/or arm 334 to secure the clamp 300 with the side rail 324. In some embodiments, a pad 328 may be positioned between bed rail 314 and side rail 324 to prevent the side rail 324 from damaging the bed rail 314.

Figure 4A:
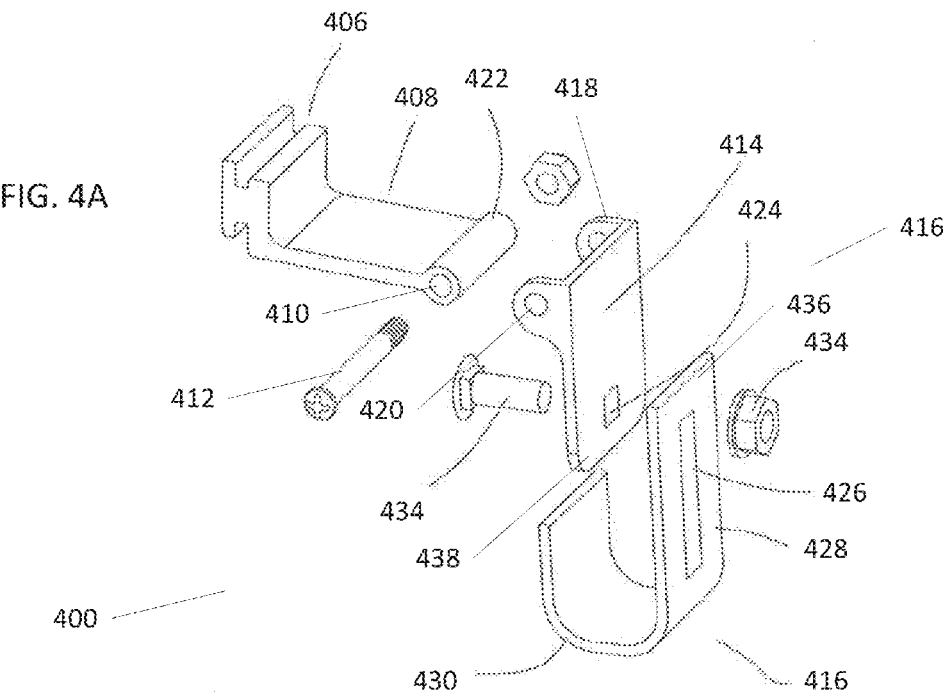
FIG. 4A shows an exploded view of a clamp according to embodiments.
Figure 4B:
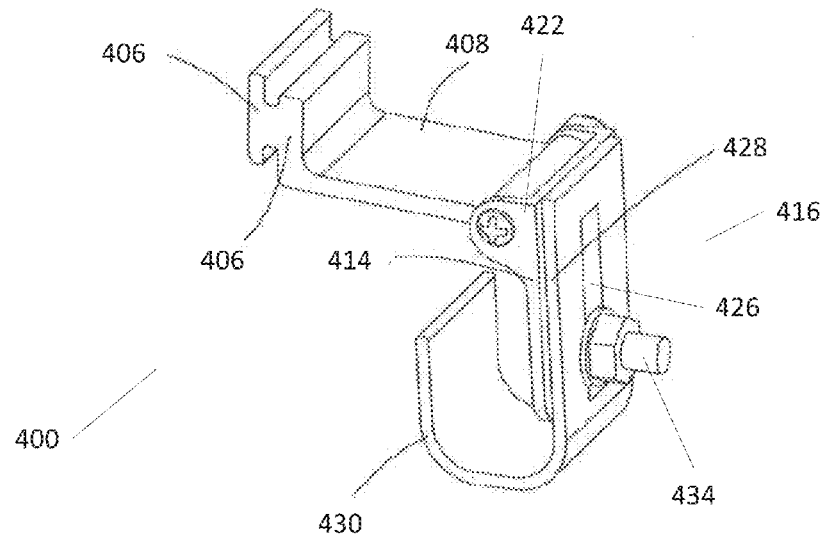
FIG. 4B shows the clamp of FIG. 4A clamp according to embodiments.
Figure 4C:
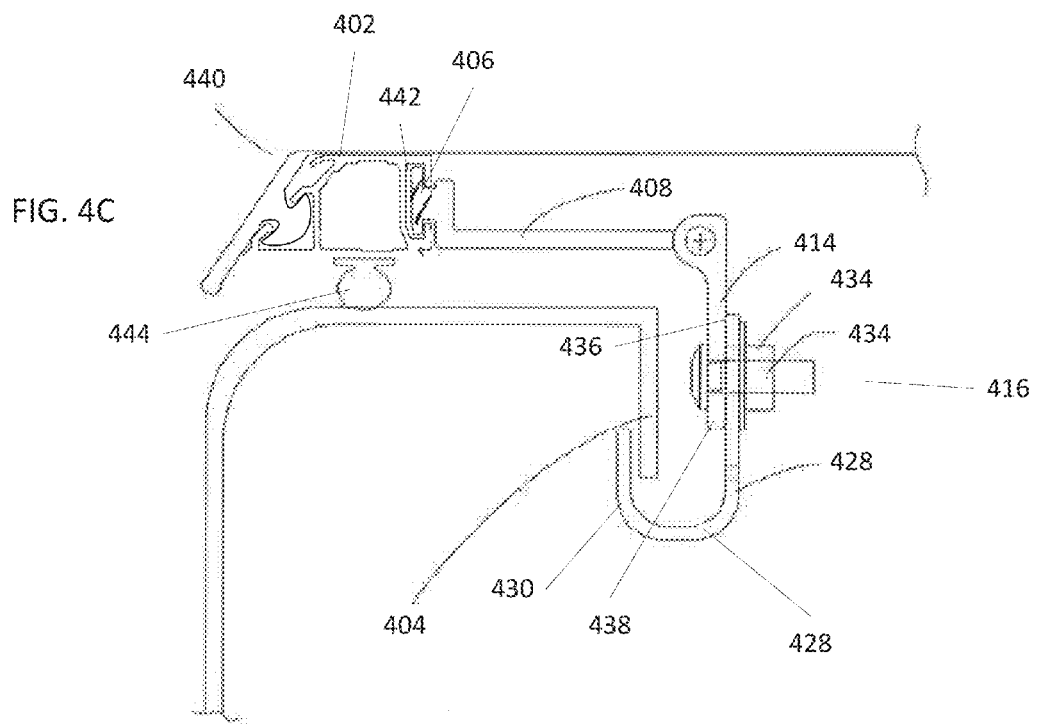
FIG. 4C shows the clamp of FIG. 4A clamp securing a side rail to a bed rail according to embodiments.
Figure 4D:
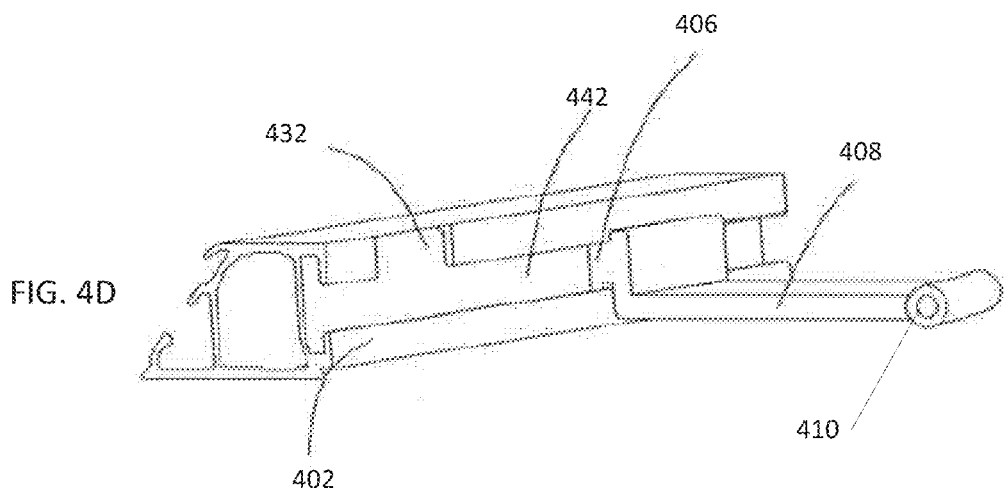
FIG. 4D shows a mounting portion of the clamp of FIG. 4A inserted into a slot of a side rail according to embodiments.

FIGS. 4A-4D depict a clamp 400 used to secured a side rail 402 and cover 440 to a bed rail 404 of a truck. As shown in FIG. 4A, clamp 400 may include a mounting portion 406 extending from an arm 408. Arm 408 may define an aperture 410 configured to receive a fastener 412. Clamp 400 may include upper portion 414 of a hook assembly 416. The upper portion 414 may include one or more brackets 418 having apertures 420. When aligned, apertures 410 and 420 may form a hinge 422 or other pivotable joint as seen in FIG. 4B. Hinge 422 may be coupled using fastener 412 and allows hook assembly 416 to rotate about an axis of hinge 422 to make installation of clamp 400 easier. The upper portion 414 may define an aperture 424 that may be aligned with an aperture 426 on a lower portion 428 of the hook assembly 416. Lower portion 428 may include a hook feature 430 that interfaces with an inner surface of bed rail 404 as seen in FIG. 4C. When aligned, apertures 426 and 424 may receive a fastener 434 that is tightenable to secure the clamp 400 onto the bed rail 432. In some embodiments, the fastener 434 may be tightenable using a knob or handle, such as described in FIGS. 3A-3C. Fastener 434 may be a screw, bolt and nut, clamp, and/or other fastening device. In some embodiments, one or both of the apertures 424 and/or aperture 426 may be elongated such that a length of the hook assembly 416 may be adjusted by moving a top end 436 of the lower portion 428 relative to a bottom end 438 of the upper portion 414 to adjust a length of the hook assembly 416 to fit the bed rail 404. In some embodiments, arm 408 extends between mounting portion 406 and aperture 410 such that side rail 402 coupled with the mounting portion 406 is positioned at or near an outer edge of bed rail 404 while aperture 410 is position above and/or within a bed of the truck. In some embodiments, a pad 444 may be positioned between bed rail 404 and a side rail 402 and/or arm 408 to prevent the side rail 402 from damaging the bed rail 404. As shown in FIG. 4D, the mounting portion 406 is configured to be insertable into an opening 446 of side rail 402, similar to opening 922 of FIGS. 9A-9C. The mounting portion 406 may then be slid into a desired position of a channel or slot 442 in the side rail 402 to secure the clamp 400 with the side rail 402.

Figure 5D:
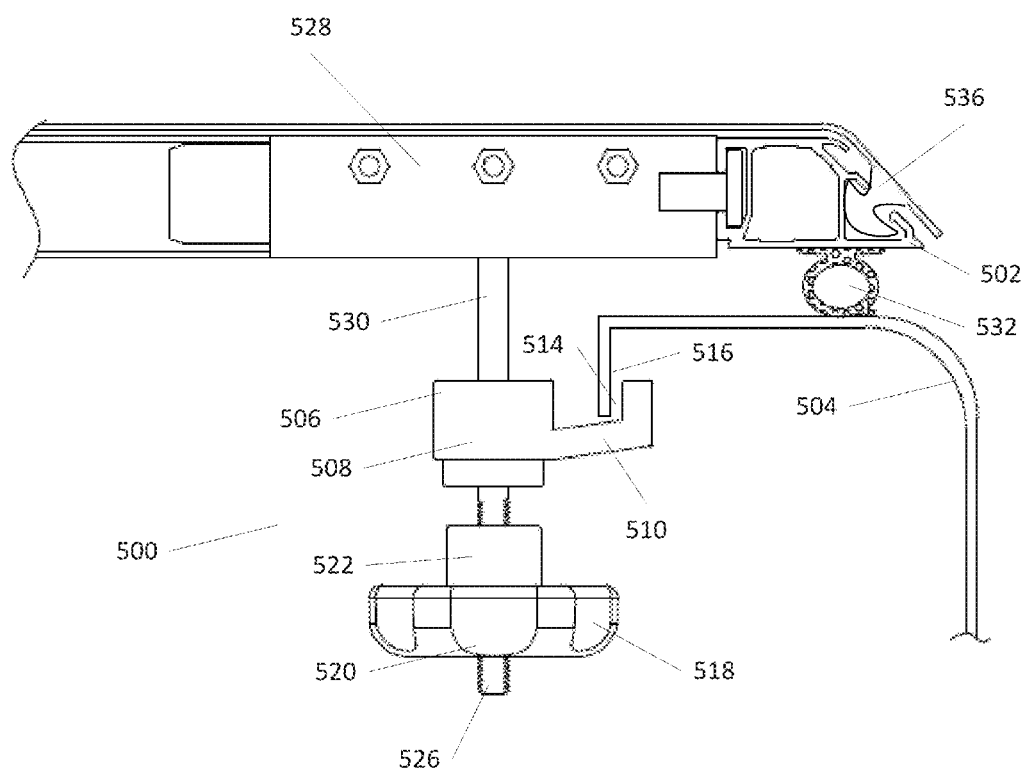
FIG. 5D depicts the clamp of FIG. 5C securing a side rail to a bed rail according to embodiments.

FIGS. 5A-5D depict a clamp 500 configured to secure a side rail 502 to a bed rail 504 of a truck. In some embodiments, clamp 500 may also be used to secure a cover rail to a side rail and/or a bed rail. FIG. 5A depicts a hook portion 506 having a base portion 508 and a hook 510. The base portion 508 may define an aperture 512 extending through the entire base portion 508. The hook 510 includes an inner surface 514 that is configured to contact an inner surface 516 of bed rail 504 as seen in FIG. 5D. Referring now to FIG. 5B, a knob 518 is shown. Knob 518 may have a handle 520 and a stem 522. Stem 522 may define a threaded aperture 524. Threaded aperture 524 may be aligned with aperture 512 of base portion 508 and a pivotable arm 530 extending from a rail 528 as shown in FIG. 5C. Rail 528 may be coupled with side rail 502. In FIG. 5D, pivotable arm 530 may include a threaded rod 526 that extends through aperture 512 and interfaces with the threaded aperture 524 such that rotation of knob 518 may tighten and loosen hook portion 506 against bed rail 504 by forcing the base portion 508 upward. Threaded aperture 524 may extend entirely through knob 518 such that threaded rod 526 may extend through knob 518 to increase the available range of tightness. In some embodiments, pivotable arm 530 is pivotable from a storage position to a secured position. In the storage position, the pivotable arm 530 is positioned substantially parallel to a flexible tonneau cover 536 and in a secured position the pivotable arm 530 is positioned orthogonal to the flexible tonneau cover 536 such that the hook portion 506 coupled with the pivotable arm 530 is engageable with the bed rail 504. In some embodiments, a pad 532 may be positioned between side rail 502 and bed rail 504 to prevent damage to the bed rail 504.

Figure 6A:
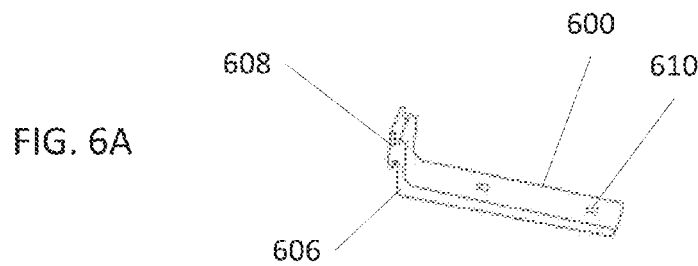
FIG. 6A shows an elongated connector according to embodiments.
Figure 6B:
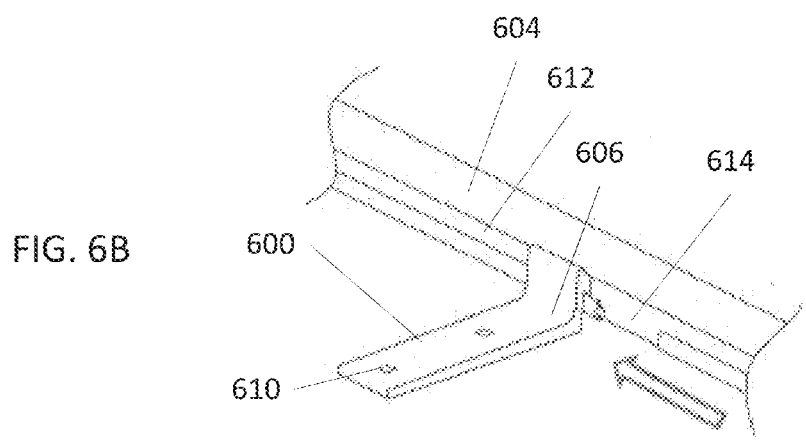
FIG. 6B shows the connector of FIG. 6A positioned within a head rail according to embodiments.
Figure 6C:
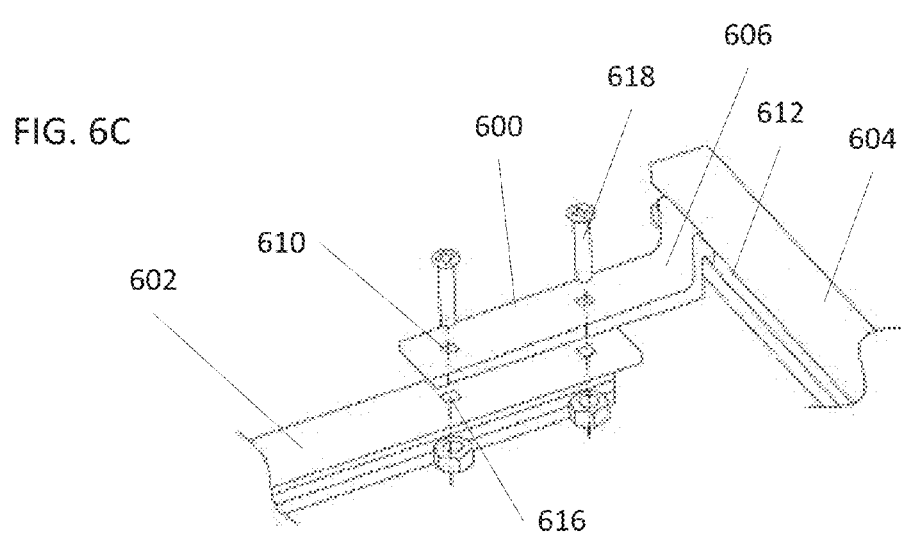
FIG. 6C shows a side rail connected to a head rail using the connector of FIG. 6A according to embodiments.

FIGS. 6A-6C show a connector 600 securing a side rail 602 to a head rail 604 according to one embodiment. FIG. 6A shows an elongated connector 600 have an L-shaped base 606 and a flanged mount 608. The connector 600 defines one or more apertures 610 along a length of the L-shaped base 606. FIG. 6B shows head rail 604 having a slot 612 running along at least a portion of the length of head rail 604. Slot 612 may be configured to interface with flanged mount 608 to retain the flanged mount 608 against the head rail 604. In some embodiments, the head rail 604 may define an opening 614 that provides access to slot 612. Flanged mount 608 may be inserted though opening 614 and slid within slot 612 to a proper position. As seen in FIG. 6C, side rail 602 may define one or more apertures 616. Side rail 602 may be positioned adjacent connector 600 such that at least some of apertures 610 are aligned with at least some of apertures 616. One or more fasteners 618 may be inserted though the aligned apertures 610 and 616 to couple the side rail 602 to connector 600, and thus side rail 602 to head rail 604. Fasteners 618 may be any type of fastener, such as nuts, bolts, screws, clamps, and the like.

Apertures 610 and/or apertures 616 may be elongated such that some adjustability is present to account for variations in truck bed sizes. When the apertures 610 and 616 are aligned in a proper position, the fasteners 618 may be tightened to secure the rails in the proper position. In some embodiments, connector 600 may be formed integral with side rail 602. However, by having connector 600 and side rail 602 as separate components, the added adjustability is provided. Additionally, installation may be easier as the head rail 604 and/or the side rail 602 may be clamped into a proper position on the truck bed first, to remove the need to someone or something to prop the rails up while the rails are coupled with one another. Once the rails are clamped, the connector 600 may be inserted into opening 614 and slid within slot 612 to a positioned aligned with side rail 602.

Figure 7A:
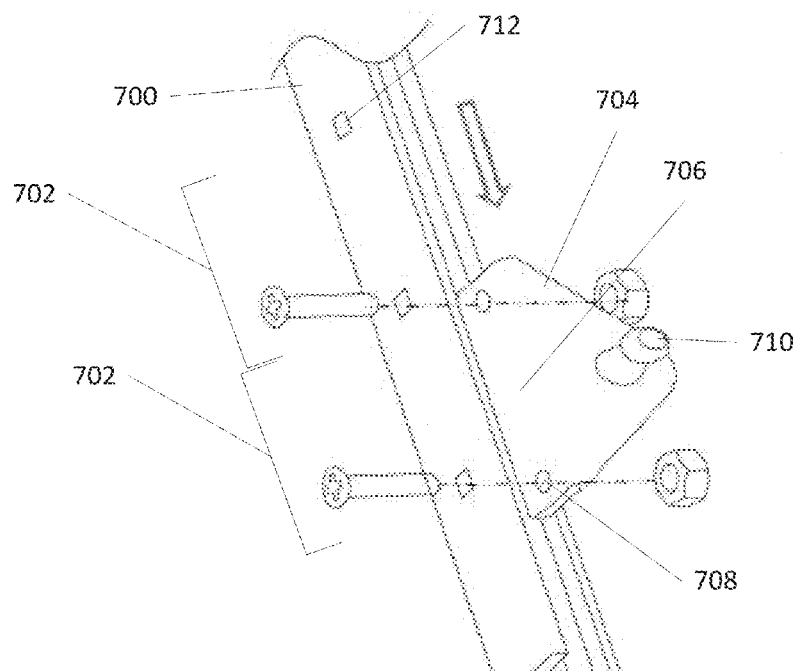
FIG. 7A shows mounting feature coupled with a side rail according to embodiments.
Figure 7B:
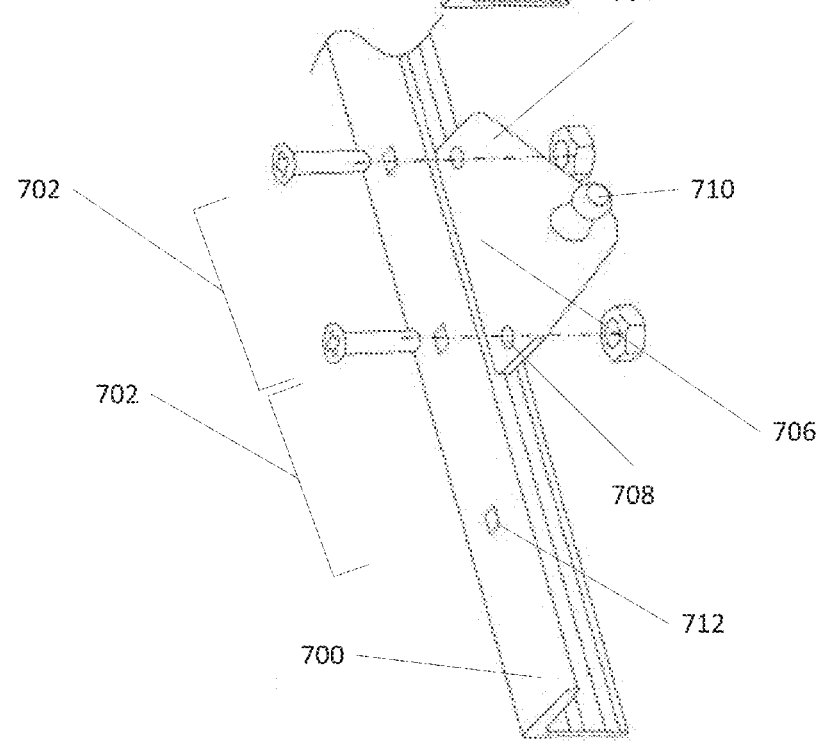
FIG. 7B shows mounting feature coupled with a side rail according to embodiments.

FIGS. 7A and 7B depict side rails 700 having multiple mounting positions 702. Side rail 700 may include a number of mounting positions 702 on which mounting features 704 may be mounted. In some embodiments, each mounting position 702 includes two or more apertures 712 defined by the side rail 700. As shown here, side rail 700 includes two mounting positions 702, each including two apertures. It will be appreciated that other numbers of mounting positions 702 may be provided, and each mounting position 702 may include more than two apertures 712. By having multiple apertures 712 for each mounting position, mounting features 704 may be more securely fastened to the mounting positions 702 with rotational movement limited.

Mounting feature 704 may include a flange 706 defining two or more apertures 708 configured to align with the mounting positions 702. In some embodiments, the mounting feature 704 includes one fewer aperture 708 than apertures 712 making up the mounting positions 702. The mounting feature 704 may also include a ball hitch 710 configured to be secured by a rod, such as rods 126 and 800 describe herein. In some embodiments, a feature other than a ball hitch is used that is securable by a rod. In other embodiments, the mounting feature 704 may include a feature configured to secure an end of the rod, such as a clamp that may lockably grasp a ball or other feature of the rod. FIG. 7A shows mounting feature 704 aligned with a first mounting position 702 formed by the two rightmost apertures 712. FIG. 7B shows mounting feature 704 aligned with a second mounting position 702 formed by the two left most apertures 712. By changing which mounting position 702 is used, an angle of a rod, and thus the angle of a folded cover, is adjusted as shown in FIGS. 1A-1H and FIGS. 9A-9C. This alters the height of the folded cover to create more or less exposure of a rear window of a truck.

It will be appreciated that other forms of mounting positions and mounting features may be used. For example, a slotted rail configured to receive a flanged portion of a rod may be used to adjust an angle of the rod relative to the truck bed. In such embodiments, a screwlike fastener may be used to tighten the flanged portion in a position in the slot to achieve a desired angle. In some embodiments, the mounting features may be permanently attached to and/or formed integral with the mounting positions to form a number of mounting features at different locations.

Figure 8A:
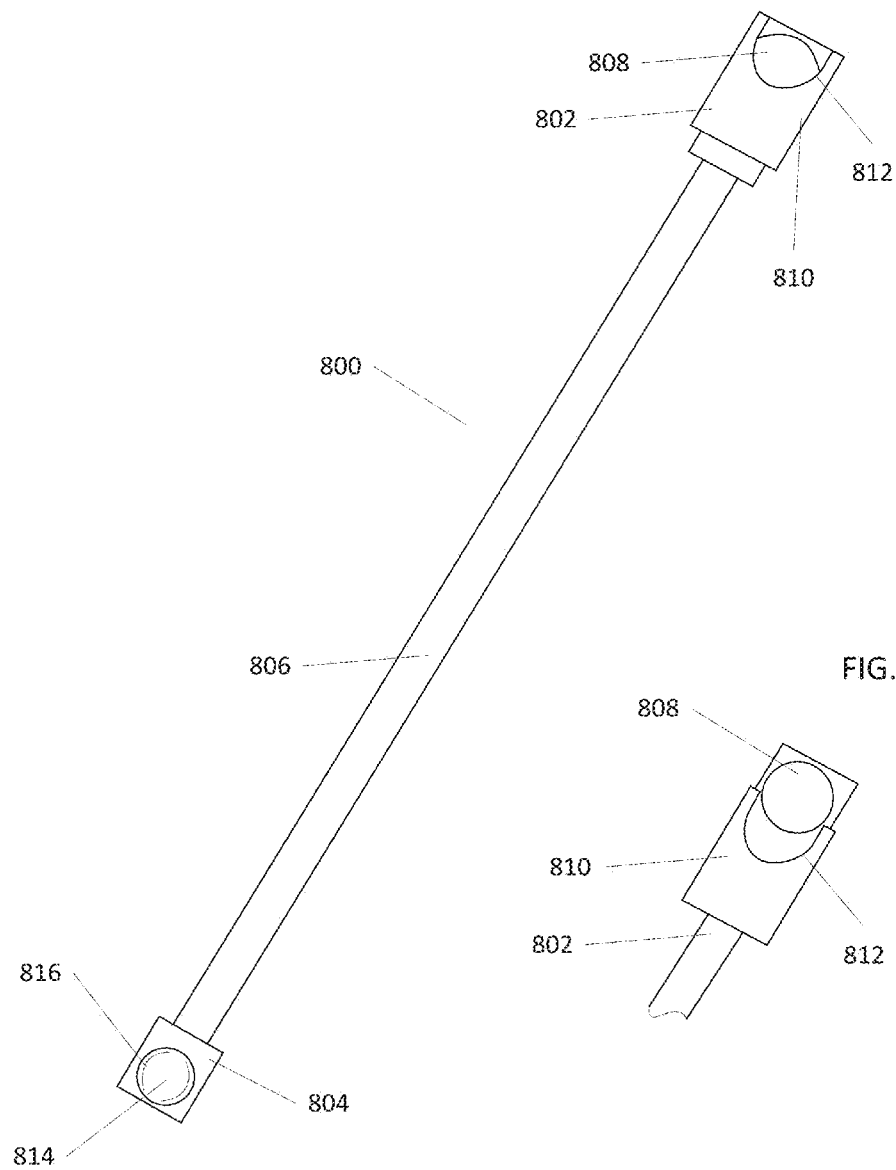
FIG. 8A shows a rod according to embodiments.
Figure 8B:
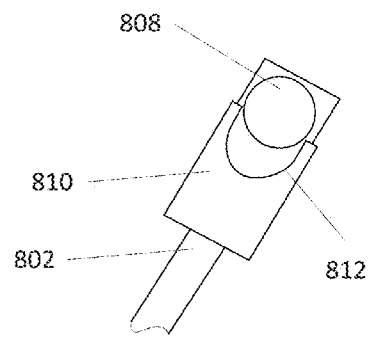
FIG. 8B shows a first end of the rod of FIG. 8A in an open position according to embodiments.

FIGS. 8A-8G depict one embodiment of a rod 800 for lockably holding a folded cover in a stowed position as described in FIGS. 1A-1G and FIGS. 9A-9C. FIG. 8A shows rod 800 having a first end 802 and a second end 804 separated by a center rod 806. The first end 802 and the second end 804 are each configured to lockably receive a ball hitch of a mounting feature, such as a ball hitch 710 of FIGS. 7A-7C and ball hitches 904 and 932 of FIGS. 9A-9C. The first end 802 may include a chamber 808 configured to receive the ball hitch. Near the first end 802, the center rod 806 may include a spring biased sleeve 810 that retains the ball hitch within chamber 808 in a first covered position. The sleeve 810 is slidable toward second end 804 from the first covered position to a second exposed position where the ball hitch is removable from the chamber 808 as shown in FIG. 8B. In some embodiments, the sleeve 810 may include a cutout portion 812 such that the sleeve 810 does not need to be retracted as far to expose chamber 808. Cutout portion 812 may be a U-shaped cutout as shown here, or may be any other shape, such as a rectangular, elliptical, or other cutout. The cutout portion 812 may be sized and shaped based on the size and shape of the ball hitch or other mounting feature to be received within chamber 808.

Figure 8C:
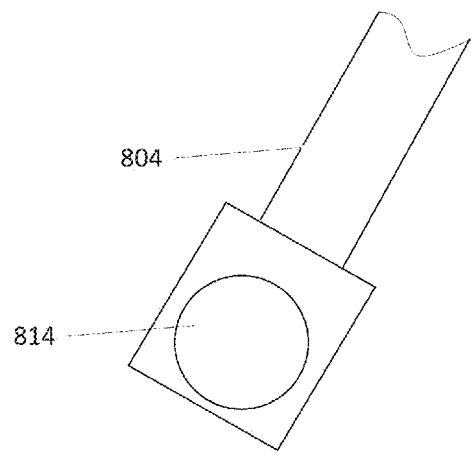
FIG. 8C shows a second end of the rod of FIG. 8A in an open position according to embodiments.
Figure 8D:
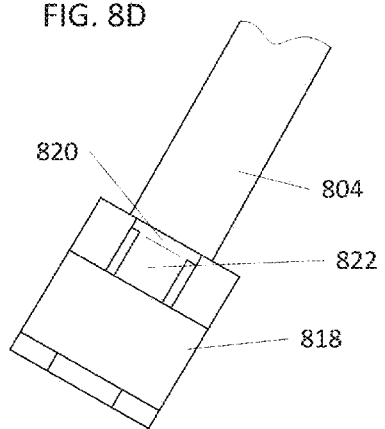
FIG. 8D shows a second end of the rod of FIG. 8A in a closed position according to embodiments.
Figure 8E:
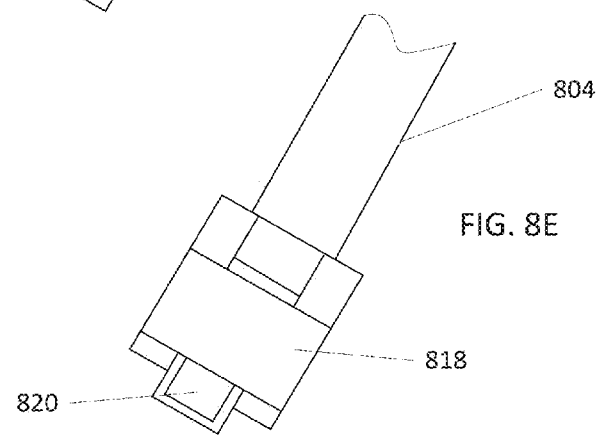
FIG. 8E, shows a second end of the rod of FIG. 8A in a closed position according to embodiments.
Figure 8F:
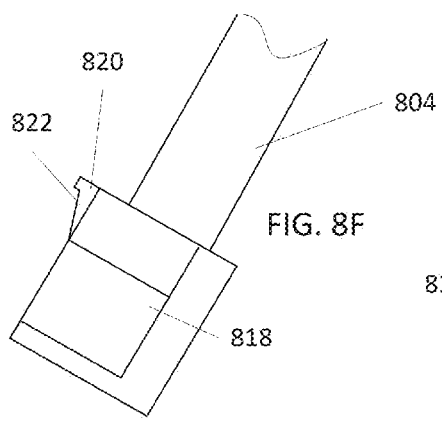
FIG. 8F shows a second end of the rod of FIG. 8A in an open position according to embodiments.
Figure 8G:
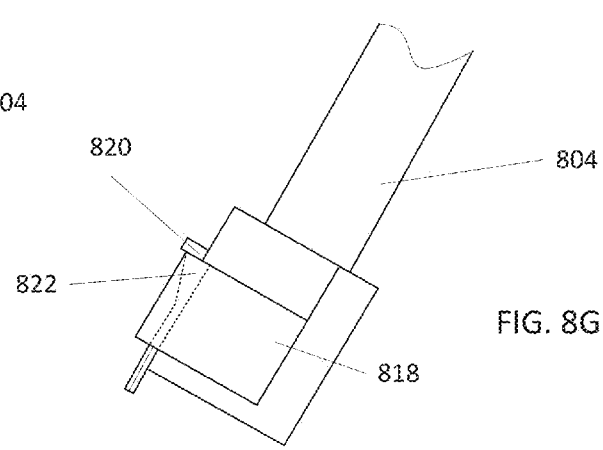
FIG. 8G shows a second end of the rod of FIG. 8A in an open position according to embodiments.

Referring back to FIG. 8A, second end 804 may include a chamber 814 configured to receive a ball hitch. Arms 816 of a flexible u-shaped retaining member 818 may secure the ball hitch within chamber 814 when in a first retaining position. FIG. 8C shows chamber 808 able to receive the ball hitch with arms 816 of U-shaped retaining member 818 in a second open position. FIG. 8D shows a side of second end 804 opposite the opening of chamber 808 with U-shaped retaining member 818 in the first retaining position. A wedge element 820 is slidable within a track positioned underneath U-shaped retaining member 818. As seen in FIG. 8E, in the first retaining position, a thicker portion 822 of wedge element 820 extends beyond a top surface of U-shaped retaining member 818. FIG. 8F shows wedge element 820 slid to engage the u-shaped retaining member 818 to move U-shaped retaining member 818 into the second open position. FIG. 8G shows thicker portion 822 of wedge element 820 engaging U-shaped retaining member 818. U-shaped retaining member 818 is pulled upward, causing the arms 816 to retract into the first open position. In some embodiments, a portion of wedge element 820 may extend beyond the second end 804 when slid to engage U-shaped retaining member 818, while in other embodiments, all of wedge element 820 may remain within the periphery of second end 804.

It will be appreciated that in some embodiments, both the first end 802 and the second end 804 may have the same ball hitch receiving mechanism. Other mechanisms may be used to secure a ball hitch or other mounting feature within a portion of a rod, such as a clamp configured to grasp a portion of the mounting feature. In other embodiments, the first end 802 and/or the second end 804 may be configured to be lockably received in a mounting feature. For example, the first end 802 and/or the second end 804 may include one or more mating features, such as a ball hitch, that may be received within a structure of the mounting device, such as the ball hitch receiving mechanisms described above on the first end 802 and the second end 804.

FIGS. 9A-9C show an embodiment of a cover 900 in a folded position. FIG. 9A shows a mounting feature 902 having a ball hitch 904 extending from a plate 906. Plate 906 may include one or more mating features configured to interface with features of a side rail 908 and/or a cover rail 910. For example, plate 906 may define one or more apertures 912. Plate 906 may also include one or more legs 914. FIG. 9B shows mounting feature 902 secured with cover rail 910. The legs 914 may be inserted within a slot or apertures (not shown) of cover rail 910. Fasteners 916 may be positioned within apertures 912 and tightened to secure mounting feature 902 to an underside or inner surface of the cover rail 910. The mounting feature 902 may be secured using one or more mounting positions, such that a location of the mounting feature 902 may be adjusted. In some embodiments, mounting feature 902 may be secured directly to cover 900, while in other embodiments, cover rail 910 is secured to the cover 900. Cover 900 is in a folded position near a front portion of side rail 908. In some embodiments, a head rail 918 may be coupled with side rail 908 using a connector 920. Head rail 918, side rail 908, and connector 920 may be the same as those described in the previous figures. For example, connector 920 may be inserted into an opening 922 of head rail 918 and slid within a slot 938 to align with the side rail 908. In some embodiments, there may not be a head rail, and in other embodiments, the head rail may be formed integral with the side rail. Other forms of connectors may be used to couple side rail 908 with head rail 918. For example, one or more brackets, clamps, and/or fasteners may be used to couple the rails. In some embodiments, side rail 908 may include one or more mounting positions 924, similar to mounting positions 702 of FIGS. 7A and 7B For example, mounting positions 924 may be formed from two or more apertures 926 defined by side rail 908. A side mounting feature 928 may be removably coupled with the side rail 908 using one of the mounting positions 924. The side mounting feature 928 may be configured to lockably couple with a rod 930, as shown in FIG. 9C. For example, a ball hitch 932 of side mounting feature 928 may be received in a lockable chamber of a first end 934 of rod 930, similar to the first end 802 of FIGS. 8A-8G. A second end 936 of rod 930 may receive the ball hitch 904 to maintain the cover 900 in an upright, folded position. A location of the mounting feature 902 and/or mounting feature 928 may be adjusted to change the angle of rod 930, which changes a height of the folded cover 900 create more or less visibility through a rear window of a truck. In some embodiments, one or more ends of the rod 930 may be configured to be secured within a mounting feature of the side rail 908 or cover rail 910.

FIGS. 10A-10C show one embodiment of a corner piece 1000 that may couple multiple side rails 1002 together. As seen in FIG. 10A, corner piece 1000 may include a base 1004 coupled with a baseplate 1006, such as by using fasteners 1008. FIG. 10B shows an interior 1010 of base 1004 with one or more support structures 1012 designed to provide rigidity and/or strength to the corner piece 1000. Corner piece 1000 may be otherwise hollow to reduce material costs and/or weight. Base 1004 may include legs 1014 that are insertable into a central opening (not shown) of side rail 1002, such as central opening 206 of FIGS. 2A-2D, to couple multiple side rails 1002 together. Legs 1014 may define an opening 1022 that may further reduce material cost of the part. In some embodiments, a flange 1016 may extend parallel to legs 1014 and may be inserted into a slot (not shown) of the side rail 1002, such as slot 202 of FIGS. 2A-2D. By including both legs 1014 and flange 1016, a stronger coupling may be achieved. In some embodiments, the legs 1014 and/or flange 1016 may define one or more apertures 1018. Apertures 1018 may receive fasteners 1020 to secure side rails 1002 in a proper position adjacent corner piece 1000, as shown in FIG. 10C.

FIGS. 11A and 11B show a corner piece 1100 having a base 1102 and legs 1104 extending from base 1102. Legs 1104 may be inserted into a central opening of a side rail to couple multiple side rails together, similar to corner piece 1000. Base 1102 may define a plurality of apertures 1106 that may help reduce material cost of the corner piece 1100. Apertures 1106 may be designed to enhance or maintain the structural integrity of corner piece 1100. In some embodiments, some or all of apertures 1106 may extend entirely through base 1102, while in other embodiments, apertures may extend partially through the base 1102. Apertures 1106 may be present on a top, bottom, and/or sides of base 1102. Legs 1104 may also define an opening 1108 and/or apertures 1110 to further reduce material costs. In some embodiments, corner piece 1100 may not include apertures 1106, opening 1108, and/or apertures 1110.

Figure 12A:
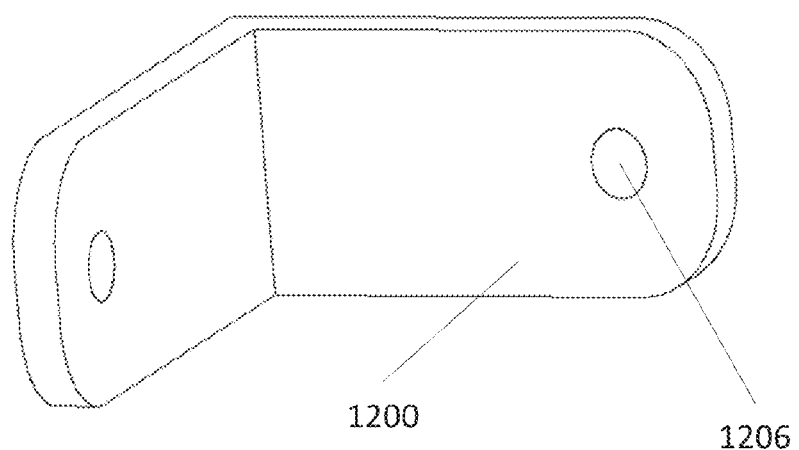
FIG. 12A shows an isometric view of a corner brace according to embodiments.
Figure 12B:
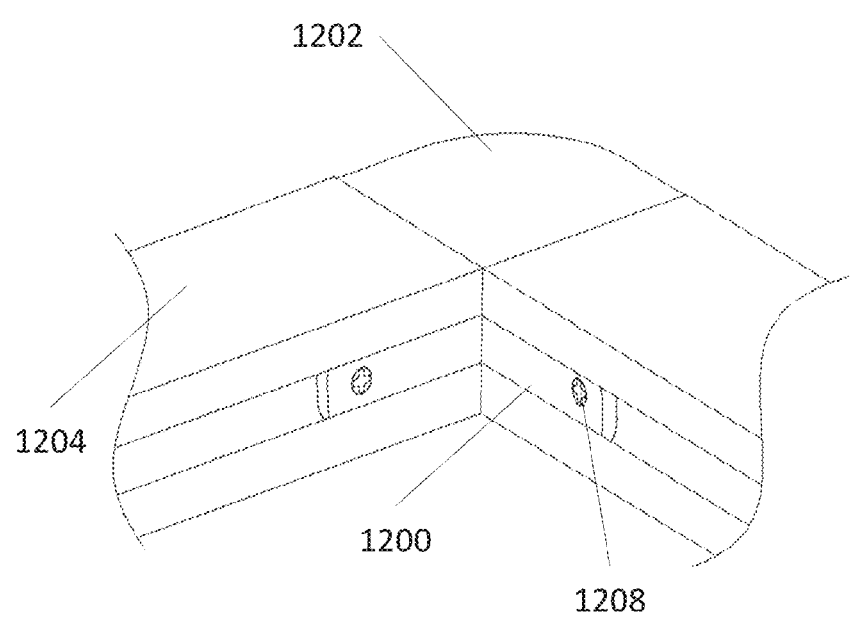
FIG. 12B shows the corner brace of FIG. 12B coupling two side rails according to embodiments.

FIGS. 12A and 12B depict a corner brace 1200 to help support a coupling between a corner piece 1202 and multiple side rails 1204. Corner piece 1202 may be a corner piece as described in FIGS. 10A-11B. FIG. 12A shows corner brace 1200 as an L-shaped piece defining one or more apertures 1206 on each side of the L-shaped piece. Corner brace 1200 may be inserted within a slot (not shown) of side rails 1204, and corner piece 1202 is coupled with the side rails 1204, such as by legs (not shown) of corner piece 1202 being inserted within a central opening (not shown) of side rails 1204. FIG. 12B shows fasteners 1208 inserted into apertures 1206. Fasteners 1208 may extend through apertures (not shown) in side rails 1204 and/or corner piece 1202 to secure the side rails 1204 to the corner brace 1200 and/or corner piece 1202 in a proper position. Along with helping to secure the corner piece 1202 with side rails 1204, corner brace 1200 may provide additional strength and support to the coupling.

The components and features described herein may be formed from any material, such as a plastic or metal. Metal alloys, such as those containing aluminum, steel, and/or titanium, may add ruggedness and enhance the safety of the cover systems described herein. Pads may be provided to place between components of the cover systems and the bed rails to prevent damage to the bed rails. For example, pads may be included between the bed rails and side rails, clamps, and/or corner pieces. Components and features described herein having similar names may be interchanged within embodiments. Additionally, it will be appreciated that embodiments of the invention may add, subtract, separate, form integral, combine, and/or otherwise manipulate the features described herein.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A tonneau cover system for covering a bed of a pickup truck, the system comprising:
    a first side rail attachable to a first bed rail of the pickup truck, the first side rail having a first plurality of mounting positions, the first side rail defining a first side rail slot extending along a length of the first side rail and at least one first side rail opening disposed at a medial position of the first side rail, the medial position of the first side rail being disposed along the length of the first side rail between a first end and a second end of the first side rail, the at least one first side rail opening providing access to the first side rail slot at an angle at least substantially orthogonal to a longitudinal axis of the first side rail slot at the medial position of the first side rail;
    a second side rail attachable to a second bed rail of the pickup truck, the second side rail having a second plurality of mounting positions, the second side rail defining a second side rail slot extending along a length of the second side rail and at least one second side rail opening disposed at a medial position of the second side rail, the medial position of the second side rail being disposed along the length of the second side rail between a first end and a second end of the second side rail, the at least one second side rail opening providing access to the second side rail slot at an angle at least substantially orthogonal to a longitudinal axis of the second side rail slot at the medial position of the second side rail;
    a plurality of clamps configured to secure the first side rail to the first bed rail and the second side rail to the second bed rail, wherein:
        each of the plurality of clamps comprises a clamp mating feature configured to be slidably secured within the first side rail slot or the second slide rail slot after the clamp mating feature is inserted within the at least one first side rail opening at an angle at least substantially orthogonal to the longitudinal axis of the first side rail slot or within the at least one second side rail opening at an angle at least substantially orthogonal to the longitudinal axis of the second side rail slot to gain access to the first side rail slot or the second side rail slot;
        each of the plurality of clamps further comprises:
            an arm extending from the mounting feature and configured to be positioned above the first bed rail or the second bed rail;
            a vertical member extending downward from the arm, the vertical member defining a first aperture; and
            a hook feature configured to be positioned below a bottom edge of the first bed rail or the second bed rail and to interface with an inner surface of the first bed rail or the second bed rail, the hook feature defining a second aperture;
        one or both of the first aperture and the second aperture is elongated such that a size of the clamp may be adjusted to accommodate different sized truck bed rails by raising or lowering the hook feature relative to the vertical member and the arm; and
        the size is fixed by tightening a fastener that extends through the first aperture and the second aperture;
    a cover positioned above the first side rail and the second side rail, the cover comprising:
        a first panel;
        a second panel positioned rearward of the first panel; and
        a first cover rail coupled near a first end of a bottom surface of the first panel;
        a second cover rail coupled near a second end of the bottom surface of the first panel;
        a third cover rail coupled near a first end of a bottom surface of the second panel;
        a fourth cover rail coupled near a second end of the bottom surface of the second panel;
        a first hinge;
        a second hinge, wherein the first hinge is positioned between and coupled with the first cover rail and the third cover rail, and wherein the second hinge is positioned between and coupled with the second cover rail and the fourth cover rail such that the first panel is pivotably coupled with the second panel;
        a first mounting feature removably coupled with the first cover rail; and
        a second mounting feature removably coupled with second cover rail;
        a third mounting feature removably coupled with one of the first plurality of mounting positions;
        a fourth mounting feature removably coupled with one of the second plurality of mounting positions;
        a first rod removably coupled with the first mounting feature and the third mounting feature; and
        a second rod removably coupled with the second mounting feature and the fourth mounting feature, the first rod and the second rod being configured to maintain the cover in a folded position.

2. The tonneau cover system for covering a bed of a pickup truck according to claim 1, wherein in the folded position, a major surface of the first panel and a major surface of the second panel are substantially parallel and positioned at an upward angle.

3. The tonneau cover system for covering a bed of a pickup truck according to claim 1, wherein the first hinge and the second hinge are positioned underneath the cover such that the cover protects a top of the first hinge and the second hinge.

4. The tonneau cover system for covering a bed of a pickup truck according to claim 1, wherein the first mounting feature, the second mounting feature, the third mounting feature, and the fourth mounting feature each comprise a ball hitch.

5. The tonneau cover system for covering a bed of a pickup truck according to claim 1, wherein the first rod and the second rod each comprise a first end and a second end separated by a center rod, wherein each of the first end and the second end is configured to lockably receive a ball hitch of the first mounting feature, the second mounting feature, the third mounting feature, or the fourth mounting feature.

6. The tonneau cover system for covering a bed of a pickup truck according to claim 5, wherein one or both of the first end or the second end comprises a chamber configured to receive the ball hitch, and wherein the center rod comprises a spring biased sleeve that is slidable from a first covered position that secures the ball hitch within the chamber to a second exposed position where the ball hitch is removable from the chamber.

7. The tonneau cover system for covering a bed of a pickup truck according to claim 5, wherein one or both of the first end or the second end comprises a chamber configured to receive the ball hitch, and wherein the center rod comprises a flexible u-shaped retaining member having a first position where the ball hitch is secured within the chamber and a second position where the ball hitch is removable from the chamber, and wherein the center rod comprises a wedge element that is slidable such that a thicker portion of the wedge element engages the flexible u-shaped retaining member to move the flexible u-shaped retaining member from the first position to the second position.

8. A tonneau cover system for covering a bed of a pickup truck, the system comprising:
a first side rail attachable to a first bed rail of the pickup truck, the first side rail having a plurality of mounting positions, the first side rail defining a first side rail slot extending along a length of the first side rail and at least one first side rail opening disposed at a medial position of the first side rail, the medial position of the first side rail being disposed along the length of the first side rail between a first end and a second end of the first side rail, the at least one first side rail opening providing access to the first side rail slot at an angle at least substantially orthogonal to a longitudinal axis of the first side rail slot at the medial position of the first side rail;
a second side rail attachable to a second bed rail of the pickup truck, the second side rail defining a second side rail slot extending along a length of the second side rail and at least one second side rail opening disposed at a medial position of the second side rail, the medial position of the second side rail being disposed along the length of the second side rail between a first end and a second end of the second side rail, the at least one second side rail opening providing access to the second side rail slot at an angle at least substantially orthogonal to a longitudinal axis of the second side rail slot at the medial position of the second side rail;
a head rail coupled between the first side rail and the second side rail;
a plurality of clamps configured to secure the first side rail to the first bed rail and the second side rail to the second bed rail, wherein:
each of the plurality of clamps comprises a clamp mating feature configured to be slidably secured within the first side rail slot or the second slide rail slot after the clamp mating feature is inserted within the at least one first side rail opening at an angle at least substantially orthogonal to the longitudinal axis of the first side rail slot or within the at least one second side rail opening at an angle at least substantially orthogonal to the longitudinal axis of the second side rail slot to gain access to the first side rail slot or the second side rail slot;
each of the plurality of clamps further comprises:
an arm extending from the mounting feature and configured to be positioned above the first bed rail or the second bed rail;
a vertical member extending downward from the arm, the vertical member defining a first aperture; and
a hook feature configured to be positioned below a bottom edge of the first bed rail or the second bed rail and to interface with an inner surface of the first bed rail or the second bed rail, the hook feature defining a second aperture;
one or both of the first aperture and the second aperture is elongated such that a size of the clamp may be adjusted to accommodate different sized truck bed rails by raising or lowering the hook feature relative to the vertical member and the arm; and
the size is fixed by tightening a fastener that extends through the first aperture and the second aperture;
a cover positioned above the first side rail, the second side rail, and the head rail, the cover comprising:
a first panel;
a second panel pivotably coupled with the first panel, the second panel being positioned rearward of the first panel; and
a first mounting feature removably coupled with the first panel;
a second mounting feature removably coupled with one of the plurality of mounting positions; and
a rod removably coupled with the first mounting feature and the second mounting feature such that the rod maintains the cover in a folded position.

9. The tonneau cover system for covering a bed of a pickup truck according to claim 8, wherein the plurality of mounting positions define at least three apertures, and wherein the second mounting feature comprises a plurality of fasteners that are insertable into the at least three apertures to secure the second mounting feature to the plurality of mounting positions, and wherein the plurality of fasteners comprise at least one fewer than a number of the at least three apertures such that a placement of the second mounting feature is adjustable by securing the plurality of fasteners to a different set of the at least three apertures.

10. The tonneau cover system for covering a bed of a pickup truck according to claim 9, wherein securing the plurality of fasteners to a different set of the at least three apertures changes an angle of the cover in the folded position.

11. The tonneau cover system for covering a bed of a pickup truck according to claim 8, wherein the head rail defines a first opening and a second opening that each provide access to a slot running along a length of the head rail, the first opening configured to receive an end of the first side rail and the second opening configured to receive an end of the second side rail such that the end of the first side rail and the end of the second side rail are securable within the slot.

12. A tonneau cover system for covering a bed of a pickup truck, the system comprising:
a first side rail attachable to a first bed rail of the pickup truck, the first side rail having a plurality of mounting positions, the first side rail defining a first side rail slot extending along a length of the first side rail and at least one first side rail opening disposed at a medial position of the first side rail, the medial position of the first side rail being disposed along the length of the first side rail between a first end and a second end of the first side rail, the at least one first side rail opening providing access to the first side rail slot at an angle at least substantially orthogonal to a longitudinal axis of the first side rail slot at the medial position of the first side rail;

a second side rail attachable to a second bed rail of the pickup truck, the second side rail defining a second side rail slot extending along a length of the second side rail and at least one second side rail opening disposed at a medial position of the second side rail, the medial position of the second side rail being disposed along the length of the second side rail between a first end and a second end of the second side rail, the at least one second side rail opening providing access to the second side rail slot at an angle at least substantially orthogonal to a longitudinal axis of the second side rail slot at the medial position of the second side rail;

a plurality of clamps configured to secure the first side rail to the first bed rail and the second side rail to the second bed rail, wherein:

each of the plurality of clamps comprises a clamp mating feature configured to be slidably secured within the first side rail slot or the second slide rail slot after the clamp mating feature is inserted within the at least one first side rail opening at an angle at least substantially orthogonal to the longitudinal axis of the first side rail slot or within the at least one second side rail opening at an angle at least substantially orthogonal to the longitudinal axis of the second side rail slot to gain access to the first side rail slot or the second side rail slot;

each of the plurality of clamps further comprises:
an arm extending from the mounting feature and configured to be positioned above the first bed rail or the second bed rail;
a vertical member extending downward from the arm, the vertical member defining a first aperture; and
a hook feature configured to be positioned below a bottom edge of the first bed rail or the second bed rail and to interface with an inner surface of the first bed rail or the second bed rail, the hook feature defining a second aperture;

one or both of the first aperture and the second aperture is elongated such that a size of the clamp may be adjusted to accommodate different sized truck bed rails by raising or lowering the hook feature relative to the vertical member and the arm; and the size is fixed by tightening a fastener that extends through the first aperture and the second aperture;

a cover positioned above the first side rail and the second side rail, the cover comprising a plurality of panels, each of the plurality of panels being pivotably coupled with at least one other of the plurality of panels, wherein a forwardmost panel of the plurality of panels comprises a first mounting feature;

a second mounting feature removably coupled with one of the first plurality of mounting positions; and a rod removably coupled with the first mounting portion and the second mounting portion such that the rod maintains the cover in a folded position.

13. The tonneau cover system for covering a bed of a pickup truck according to claim 12, wherein each of the plurality of panels has a sufficiently small width such that when the cover is in the folded position, at least a portion of a rear window of the pickup truck is exposed, wherein in the folded position, a major surface of the first panel and a major surface of the second panel are substantially parallel and positioned at an upward angle.

14. The tonneau cover system for covering a bed of a pickup truck according to claim 12, wherein the plurality of mounting positions define at least three apertures, and wherein the second mounting feature comprises a plurality of fasteners that are insertable into the at least three apertures to secure the second mounting feature to the plurality of mounting positions, and wherein the plurality of fasteners comprise at least one fewer than a number of the at least three apertures such that a placement of the second mounting feature is adjustable by securing the plurality of fasteners to a different set of the at least three apertures.

15. The tonneau cover system for covering a bed of a pickup truck according to claim 12, wherein the second side rail comprises a second plurality of mounting positions, wherein the forwardmost panel of the plurality of panels comprises a third mounting feature on an end opposite the first mounting feature, and wherein the tonneau cover system further comprises a fourth mounting feature removably coupled with one of the second plurality of mounting positions and a second rod removably coupled with the third mounting feature and the fourth mounting feature.

16. The tonneau cover system for covering a bed of a pickup truck according to claim 12, wherein the first mounting feature and the second mounting feature each comprise a ball hitch.

* * * * *